United States Patent
Sekiguchi et al.

(10) Patent No.: US 9,910,196 B2
(45) Date of Patent: Mar. 6, 2018

(54) DYE COMPOUND, INK, AND RESIST COMPOSITION FOR COLOR FILTER

(71) Applicant: CANON KABUSHIKI KAISHA, Tokyo (JP)

(72) Inventors: Takeshi Sekiguchi, Kawasaki (JP); Shosei Mori, Hiratsuka (JP); Taichi Shintou, Saitama (JP); Takeshi Miyazaki, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 26 days.

(21) Appl. No.: 15/024,771

(22) PCT Filed: Sep. 24, 2014

(86) PCT No.: PCT/JP2014/076233
§ 371 (c)(1),
(2) Date: Mar. 24, 2016

(87) PCT Pub. No.: WO2015/046618
PCT Pub. Date: Apr. 2, 2015

(65) Prior Publication Data
US 2016/0238756 A1    Aug. 18, 2016

(30) Foreign Application Priority Data

Sep. 27, 2013 (JP) ................. 2013-201704

(51) Int. Cl.
| | |
|---|---|
| *C09D 11/328* | (2014.01) |
| *C09D 11/037* | (2014.01) |
| *C09D 11/17* | (2014.01) |
| *C09B 33/12* | (2006.01) |
| *C09B 35/12* | (2006.01) |
| *G02B 5/22* | (2006.01) |
| *C09B 29/42* | (2006.01) |

(52) U.S. Cl.
CPC ............ *G02B 5/223* (2013.01); *C09B 29/363* (2013.01); *C09B 33/12* (2013.01); *C09B 35/12* (2013.01); *C09D 11/037* (2013.01); *C09D 11/17* (2013.01); *C09D 11/328* (2013.01)

(58) Field of Classification Search
CPC ..... C09D 11/037; C09D 11/17; C09D 11/328; C09B 33/12; C09B 35/12; G02B 5/223
USPC ....................... 106/31.48; 534/761, 766, 772
See application file for complete search history.

(56) References Cited

U.S. PATENT DOCUMENTS

| | | | |
|---|---|---|---|
| 4,083,842 A | 4/1978 | Burkhard | |
| 5,554,737 A * | 9/1996 | Lamm | C09B 33/28 534/772 |
| 6,646,111 B1 | 11/2003 | Carlini | |
| 6,673,139 B1 | 1/2004 | Wu | |
| 9,382,426 B2 * | 7/2016 | Sekiguchi | C09D 11/037 |
| 9,388,313 B2 * | 7/2016 | Katsumoto | C09D 11/037 |
| 9,580,576 B2 * | 2/2017 | Mori | G02B 5/223 |
| 9,658,553 B2 * | 5/2017 | Sekiguchi | G03G 9/0804 |
| 2004/0123403 A1 * | 7/2004 | Tzikas | C09B 33/12 8/506 |
| 2006/0293405 A1 * | 12/2006 | Araki | C07D 213/85 534/771 |
| 2009/0207287 A1 * | 8/2009 | Miya | C09B 35/03 348/273 |

FOREIGN PATENT DOCUMENTS

| | | |
|---|---|---|
| CN | 101493653 A | 7/2009 |
| DE | 2240363 A1 | 2/1973 |
| JP | 48-030734 A | 4/1973 |
| JP | 7-304975 A | 11/1995 |
| JP | 2004-526836 A | 9/2004 |
| JP | 2006-71822 A | 3/2006 |
| JP | 2006-124634 A | 5/2006 |
| JP | 2009-175451 A | 8/2009 |
| JP | 2009-299030 A | 12/2009 |
| JP | 2012-194200 A | 10/2012 |
| WO | 2012/039361 A1 | 3/2012 |
| WO | 2013/129697 A1 | 9/2013 |

OTHER PUBLICATIONS

English translation of JP 2006/071822, Mar. 2006; 65 pages.*

* cited by examiner

*Primary Examiner* — Helene Klemanski
(74) *Attorney, Agent, or Firm* — Canon U.S.A., Inc. IP Division

(57) ABSTRACT

The present invention provides a dye compound excellent in both chroma and light fastness, an ink, and a resist composition for a color filter.
The present invention provides an ink and a resist composition for a color filter, in which each of the ink and the resist composition contains a pyridone azo compound having a specific structure.

6 Claims, 1 Drawing Sheet

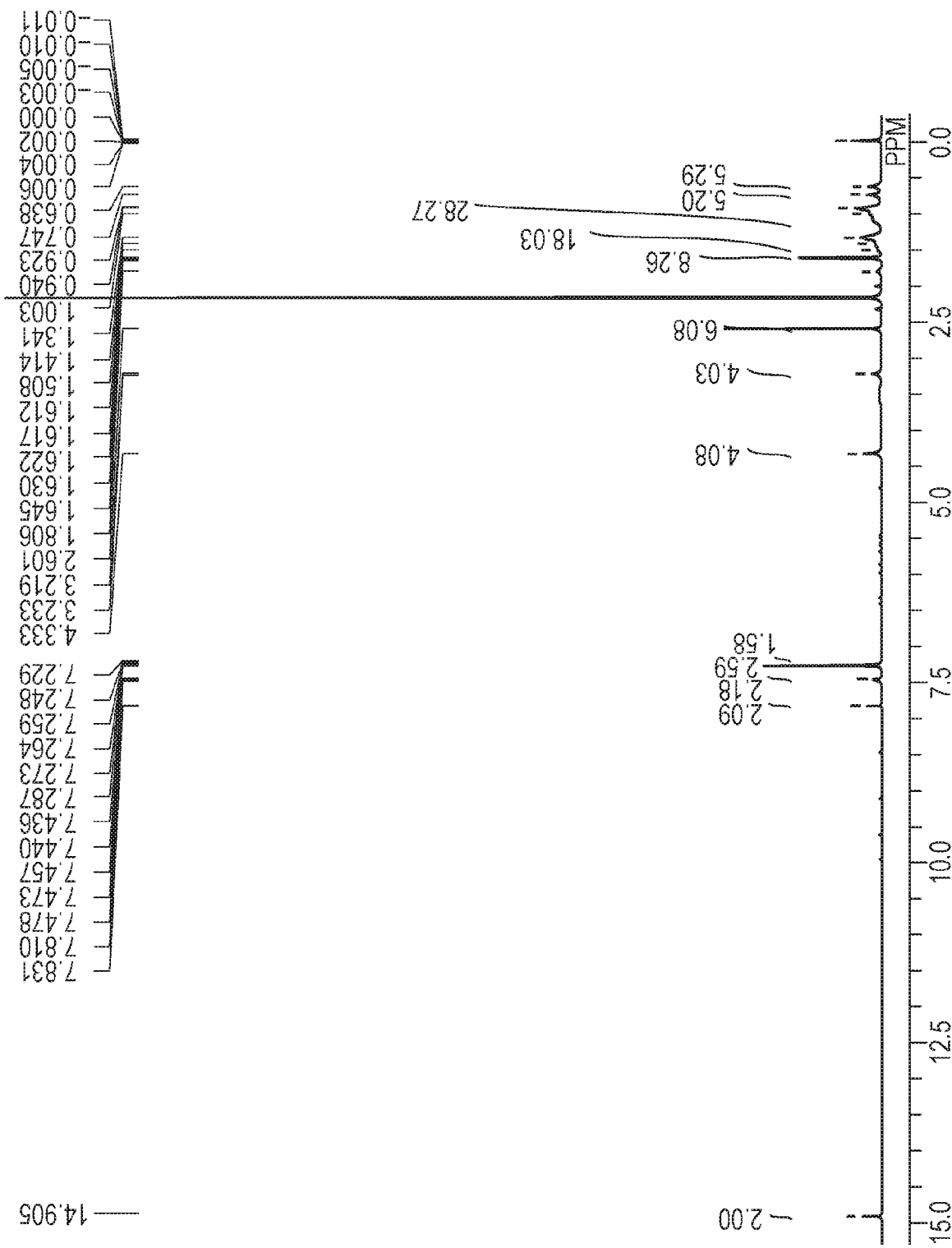

DYE COMPOUND, INK, AND RESIST COMPOSITION FOR COLOR FILTER

TECHNICAL FIELD

The present invention relates to a dye compound and an ink used in the production processes of paints, color filters, resin-molded articles, and so forth.

BACKGROUND ART

In recent years, the demand for higher-quality color images on liquid-crystal displays and so forth have been increased. With respect to achieving higher-quality images on liquid-crystal displays, color filters are used as indispensable components that influence the performance. To display or record a full-color image, dyes of the three primary colors in an additive process or a subtractive process are typically used in color filters. For example, it is reported that a pyridone azo dye-containing color filter that permits an image having satisfactory spectral characteristics and high contrast to be displayed in the subtractive process is used (see PTL 1). It is also reported that a polymer of a pyridone azo dye having a satisfactory hue and high light fastness is used (see PTL 2). To produce a color image having much higher quality, however, there has been a strong demand for the development of a dye having excellent chroma and light fastness.

CITATION LIST

Patent Literature

PTL 1 Japanese Patent Laid-Open No. 2006-124634
PTL 2 Japanese Patent Laid-Open No. 2006-71822

SUMMARY OF INVENTION

Technical Problem

The present invention provides a dye compound excellent in both chroma and light fastness, an ink, and a resist composition for a color filter, the ink and the resist composition containing the dye compound.

Solution to Problem

A first aspect of the present invention relates to a dye compound represented by the following general formula (1):

[Chem. 1]

GENERAL FORMULA (1)

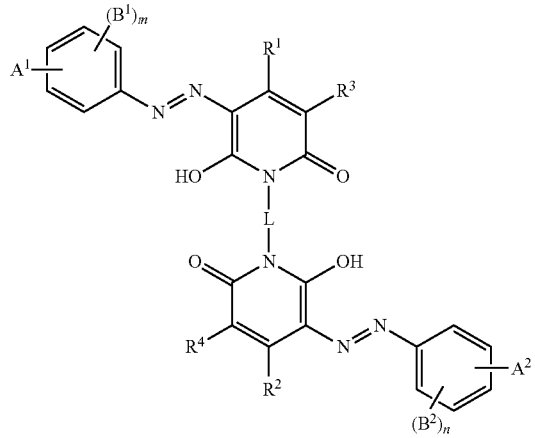

wherein in the general formula (1),
R$^1$ and R$^2$ each independently represent an alkyl group, an aryl group, or an amino group; R$^3$ and R$^4$ each independently represent a hydrogen atom, a cyano group, a carbamoyl group, a carboxylate group, or a carboxamide group,
L represents a linear alkylene group having 1 to 12 carbon atoms, a branched alkylene group having 1 to 12 carbon atoms, or a phenylene group,
m and n each independently represent an integer of 0 to 4,
i) when L represents a linear alkylene group having 1 to 12 carbon atoms or a branched alkylene group having 1 to 12 carbon atoms, A$^1$, A$^2$, B$^1$ in the case that m represents an integer of 1 to 4, and B$^2$ in the case that n represents an integer of 1 to 4, each independently represent a carboxamide group, and
ii) when L represents a phenylene group, A$^1$, A$^2$, B$^1$ in the case that m represents an integer of 1 to 4, and B$^2$ in the case that n represents an integer of 1 to 4, each independently represent a sulfonate group, a carboxamide group, or a sulfonamide group.

A second aspect of the present invention relates to an ink containing the dye compound represented by the general formula (1) and a medium, in which the dye compound is dissolved or dispersed in the medium.

A third aspect of the present invention relates to a resist composition for a color filter, the resist composition containing the dye compound, a binder resin, and a medium, in which the dye compound and the binder resin are dispersed or dissolved in the medium.

Advantageous Effects of Invention

An embodiment of the present invention provides a dye compound excellent in both chroma and light fastness.
Moreover, an embodiment of the present invention provides an ink and a resist composition for a color filter, each of the ink and the resist composition containing the dye compound and thus being excellent in both chroma and light fastness.

BRIEF DESCRIPTION OF DRAWING

The FIGURE is a $^1$H-NMR spectrum of dye compound (1) used in Example 1 in CDCl$_3$ at 400 MHz and room temperature.

DESCRIPTION OF EMBODIMENTS

Embodiments of the present invention will be described below.

Dye Compound

A dye compound represented by the general formula (1) will be described.

The inventors have conducted intensive studies to overcome the foregoing problems in the related art and have found that a dye compound represented by the following general formula (1) are excellent in both chroma and light fastness. Moreover, the inventors have found that an ink and a resist composition for a color filter, each of the ink and the resist composition containing the dye compound and thus being excellent in both chroma and light fastness. These findings have led to the completion of the present invention.

The dye compound according to an embodiment of the present invention is characterized by linking the N positions of pyridone rings with an alkylene group or a phenylene group. The formation of the linkage inhibits the stacking of molecules of the dye compound to improve the dispersibility, thereby improving the chroma. Moreover, the dye compound according to an embodiment of the present invention includes a dimeric pyridone rings linked together. Thus, the relaxation of the dye compound from its excited state is promoted, resulting in improved light fastness, compared with the case of a monomeric pyridone ring.

In addition, the incorporation of a group, such as a carboxamide group, which promotes relaxation from the excited state, into a phenyl group adjacent to an azo group improves the light fastness. In particular, in the case where a long-chain-alkyl carboxamide group is used, the dye compound has high solubility in a solvent and thus has improved chroma.

The dye compound excellent in both chroma and light fastness according to an embodiment of the present invention is provided only by simultaneously satisfying the foregoing factors.

[Chem. 2]

GENERAL FORMULA (1)

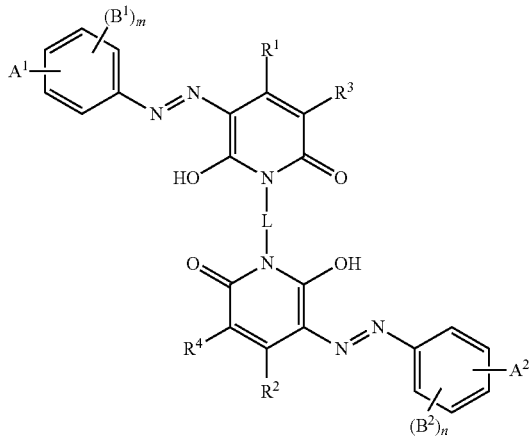

wherein in the general formula (1),
$R^1$ and $R^2$ each independently represent an alkyl group, an aryl group, or an amino group; $R^3$ and $R^4$ each independently represent a hydrogen atom, a cyano group, a carbamoyl group, a carboxylate group, or a carboxamide group,
L represents a linear alkylene group having 1 to 12 carbon atoms, a branched alkylene group having 1 to 12 carbon atoms, or a phenylene group,
m and n each independently represent an integer of 0 to 4,
i) when L represents a linear alkylene group having 1 to 12 carbon atoms or a branched alkylene group having 1 to 12 carbon atoms, $A^1$, $A^2$, $B^1$ when m represents an integer of 1 to 4, and $B^2$ when n represents an integer of 1 to 4 each independently represent a carboxamide group, and
ii) when L represents a phenylene group, $A^1$, $A^2$, $B^1$ when m represents an integer of 1 to 4, and $B^2$ when n represents an integer of 1 to 4 each independently represent a sulfonate group, a carboxamide group, or a sulfonamide group.

In the general formula (1), $R^1$ and $R^2$ each independently represent an alkyl group, an aryl group, or an amino group.

Examples of an alkyl group represented by $R^1$ and $R^2$ in the general formula (1) include, but are not particularly limited to, a methyl group, an ethyl group, a n-propyl group, an isopropyl group, a n-butyl group, a sec-butyl group, an isobutyl group, and a tert-butyl group.

Examples of an aryl group represented by $R^1$ and $R^2$ in the general formula (1) include, but are not particularly limited to, a phenyl group and a toluyl group.

Examples of an amino group represented by $R^1$ and $R^2$ in the general formula (1) include, but are not particularly limited to, an amino group, a methylamino group, and a dimethylamino group.

Each of $R^1$ and $R^2$ in the general formula (1) may represent an alkyl group, such as a methyl group, because excellent chroma and light fastness are provided.

In the general formula (1), $R^3$ and $R^4$ each independently represent a hydrogen atom, a cyano group, a carbamoyl group, a carboxylate group, or a carboxamide group.

Examples of a carboxylate group represented by $R^3$ and $R^4$ in the general formula (1) include, but are not particularly limited to, a methyl carboxylate group, a ethyl carboxylate group, a butyl carboxylate group, and an ethylhexyl carboxylate group.

Examples of a carboxamide group represented by $R^3$ and $R^4$ in the general formula (1) include, but are not particularly limited to, dialkylcarboxamide groups, such as a dimethylcarboxamide group and a diethycarboxamide group; and monoalkylcarboxamide groups, such as a methylcarboxamide group and an ethylcarboxamide group.

Each of $R^3$ and $R^4$ in the general formula (1) may represent a cyano group because excellent chroma and light fastness are provided.

In the general formula (1), L represents a linear alkylene group having 1 to 12 carbon atoms, a branched alkylene group having 1 to 12 carbon atoms, or a phenylene group.

The alkylene group represented by L in the general formula (1) is not particularly limited and may be linear or branched. Examples of the alkylene group include a methylene group, an ethylene group, a propylene group, a butylene group, a pentylene group, a hexylene group, a heptylene group, an octylene group, a nonylene group, a decylene group, a dodecylene group, and a hexadecylene group. In particular, the alkylene group may be a methylene group, an ethylene group, a propylene group, or a butylene group. An ethylene group may be used because excellent chroma and light fastness are provided.

Examples of a phenylene group represented by L in the general formula (1) include, but are not particularly limited to, a 1,2-disubstituted phenylene group, a 1,3-disubstituted phenylene group, and a 1,4-disubstituted phenylene group. In particular, a 1,3-disubstituted phenylene group may be used because excellent chroma and light fastness are provided.

Each of m and n in the general formula (1) independently represents an integer of 0 to 4, preferably represents 0 or 1, and most preferably 0.

Each of $A^1$, $A^2$, $B^1$, and $B^2$ varies depending on the structure of L. When L represents a linear alkylene group having 1 to 12 carbon atoms or a branched alkylene group having 1 to 12 carbon atoms, $A^1$, $A^2$, $B^1$ when m represents an integer of 1 to 4, and $B^2$ when n represents an integer of 1 to 4 each independently represent a carboxamide group. When L represents a phenylene group, $A^1$, $A^2$, $B^1$ when m represents an integer of 1 to 4, and $B^2$ when n represents an integer of 1 to 4 each independently represent a sulfonate group, a carboxamide group, or a sulfonamide group.

$A^1$ and $B^1$ may represent the same group. $A^2$ and $B^2$ may represent the same group. When a plurality of groups represented by $B^1$ are present, in other words, when m represents an integer of 2 to 4, the plural groups represented by $B^1$ may be the same or different. The same is true for the case where a plurality of groups represented by $B^2$ are present.

Examples of a carboxamide group represented by $A^1$, $A^2$, $B^1$, and $B^2$ in the general formula (1) include, but are not particularly limited to, dialkylcarboxamide groups, such as a dimethylcarboxamide group, a diethycarboxamide group, a di(ethylhexyl)carboxamide group, and a di(2-ethylhexyl) carboxamide group; and monoalkylcarboxamide group, such as a methylcarobxamide group, an ethylcarboxamide group, an ethylhexylcarboxamide group, and a (2-ethylhexyl)carboxamide group. Of these groups, a dialkylcarboxamide group may be used. In particular, a di(2-ethylhexyl) carboxamide group may be used because excellent chroma and light fastness are provided.

In view of the fact that each of m and n may represent zero, at least one of $A^1$ and $A^2$ may represent a dialkylcarboxamide group and, in particular, a di(2-ethylhexyl)carboxamide group.

Examples of a sulfonate group represented by $A^1$, $A^2$, $B^1$, and $B^2$ in the general formula (1) include, but are not particularly limited to, a methyl sulfonate group, a ethyl sulfonate group, a butyl sulfonate group, a ethylhexyl sulfonate group, and a 2-ethylhexyl sulfonate group. A 2-ethylhexyl sulfonate group may be used because excellent chroma and light fastness are provided.

Examples of a sulfonamide group represented by $A^1$, $A^2$, $B^1$, and $B^2$ in the general formula (1) include, but are not particularly limited to, alkylsulfonamide groups, such as a methylsulfonamide group, an ethylsulfonamide group, and a (2-ethylhexyl)sulfonamide group. In particular, a (2-ethylhexyl)sulfonamide group may be used because excellent chroma and light fastness are provided.

In the general formula (1), moieties on both sides of the group represented by L may have the same structure because excellent chroma and light fastness are provided.

The structural formula represented by the general formula (1) illustrates an azo form. However, a hydrazo form, which is a tautomeric form, is also included in an embodiment of the present invention.

The dye compound represented by the general formula (1) may be synthesized with reference to a known method described in International Publication No. WO2012/039361.

While compounds (1) to (27) are exemplified as the compound represented by the general formula (1) used in an embodiment of the present invention, the present invention is not limited to these compounds.

[Chem. 3]

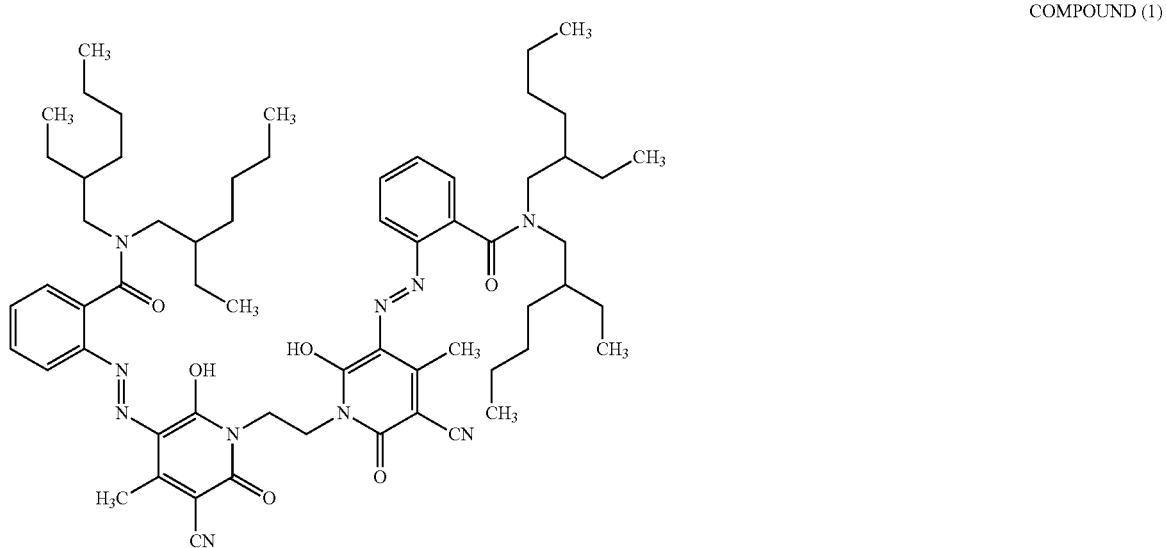

COMPOUND (1)

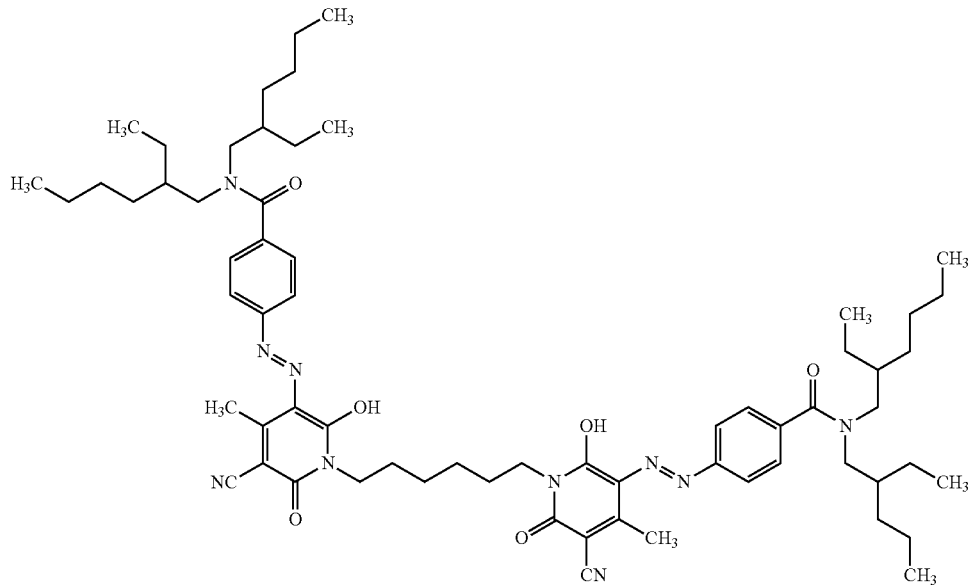

COMPOUND (2)

-continued
COMPOUND (3)
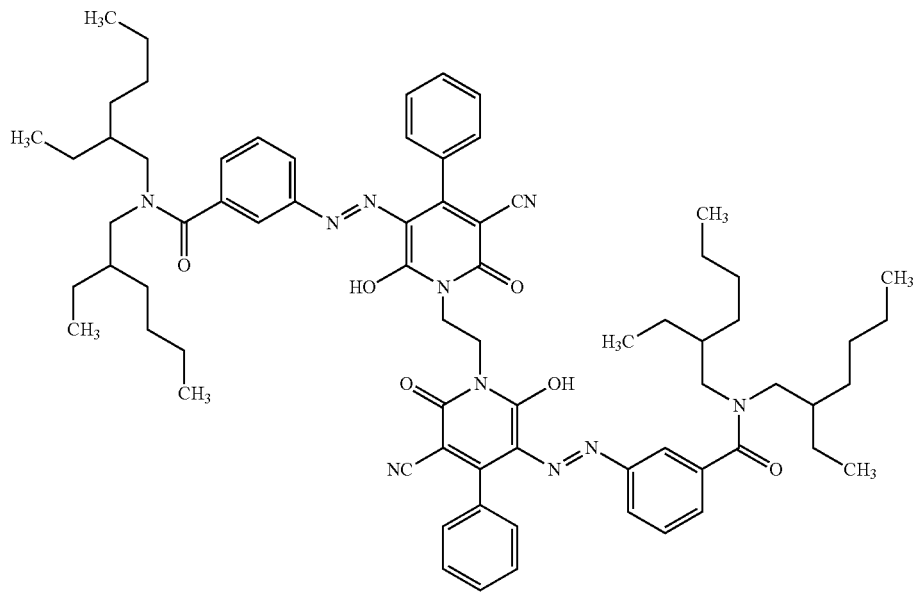
COMPOUND (4)
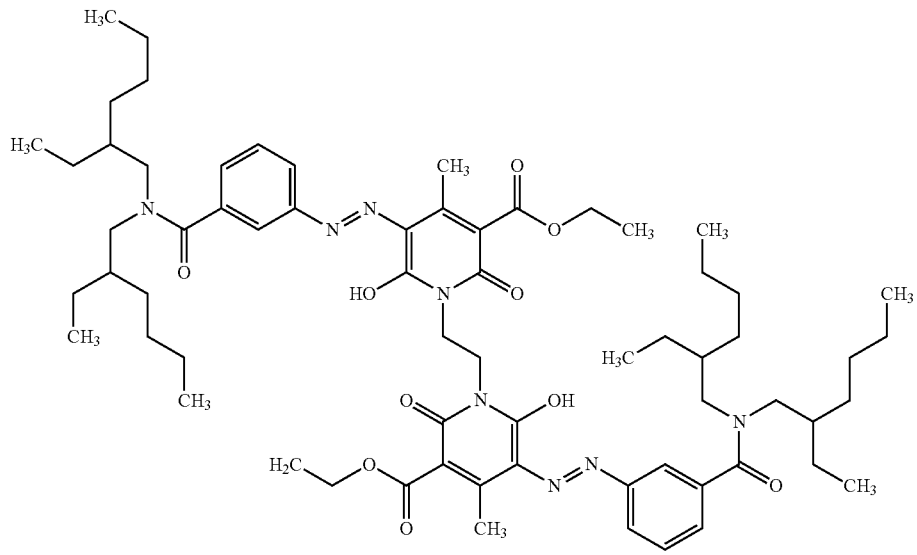

COMPOUND (5)
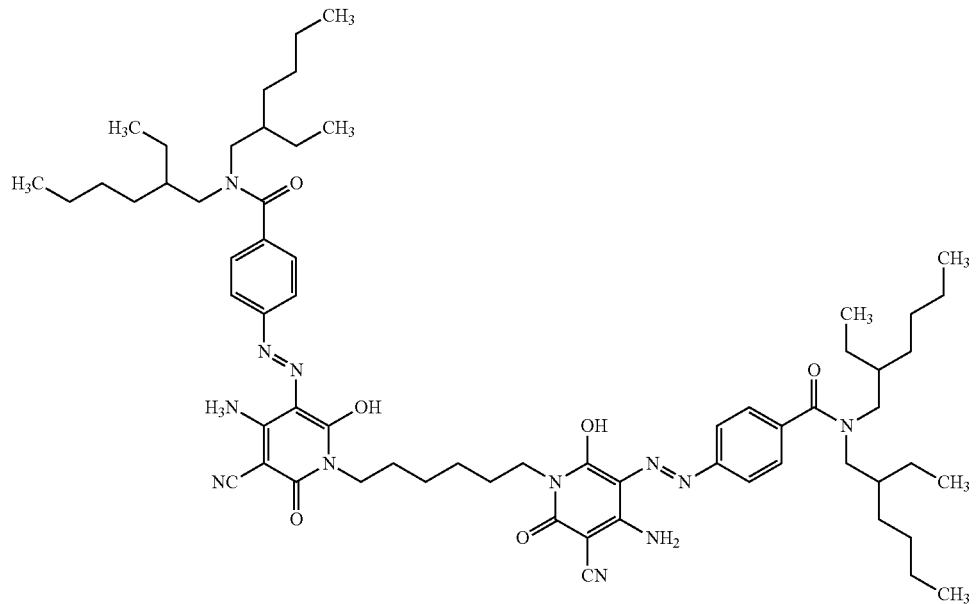
COMPOUND (6)
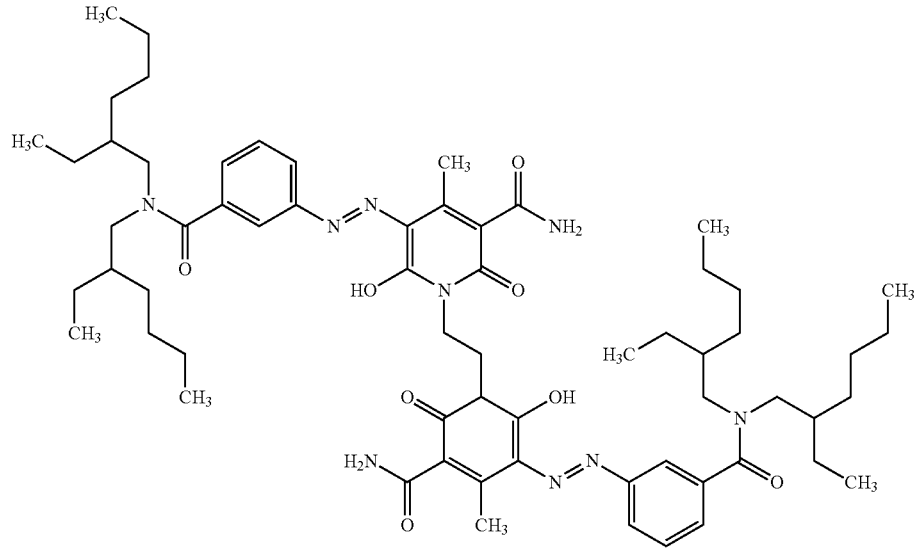
[Chem. 4]
COMPOUND (7)
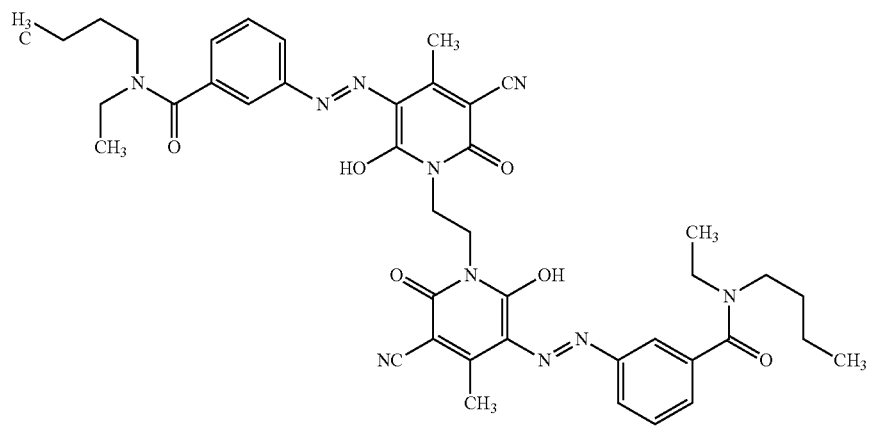

-continued
COMPOUND (8)
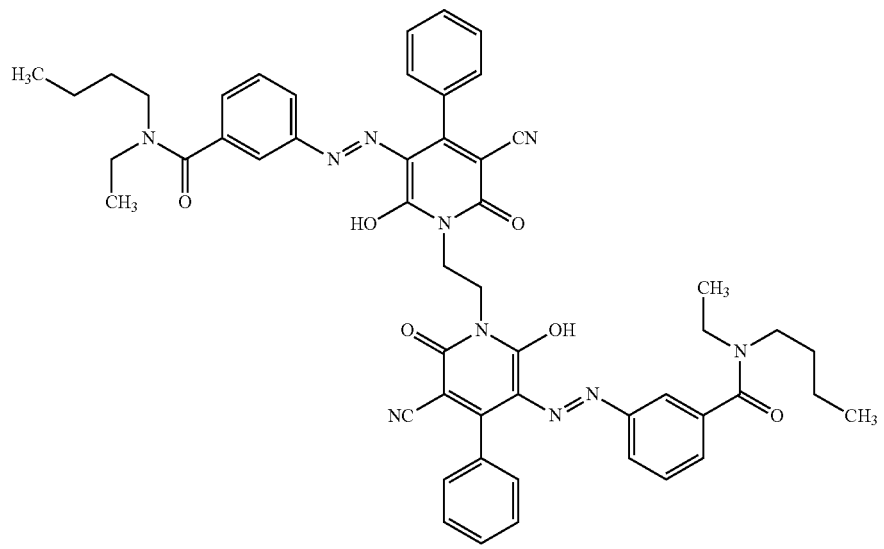
COMPOUND (9)
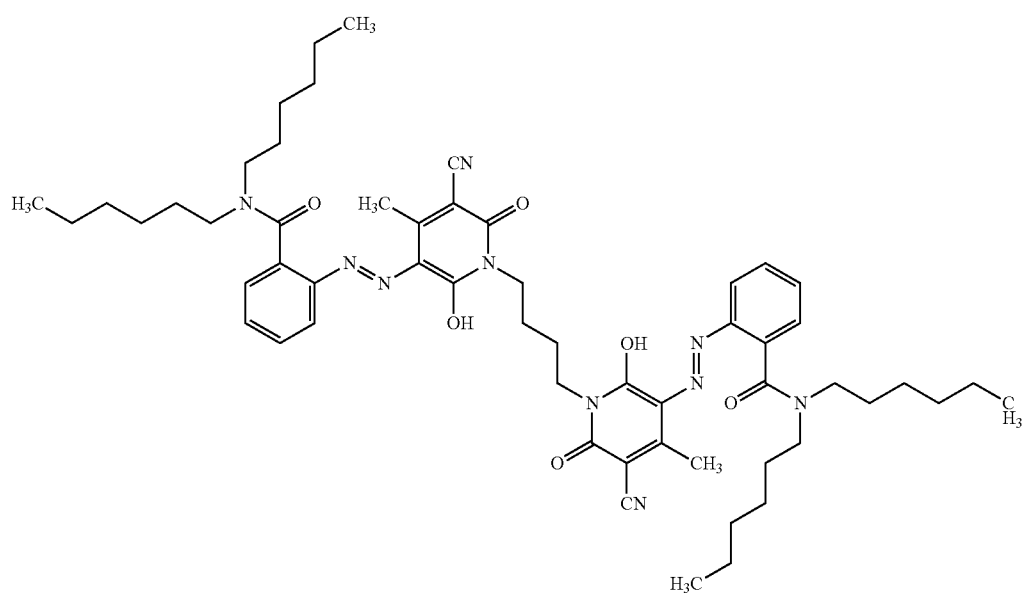

-continued
COMPOUND (10)
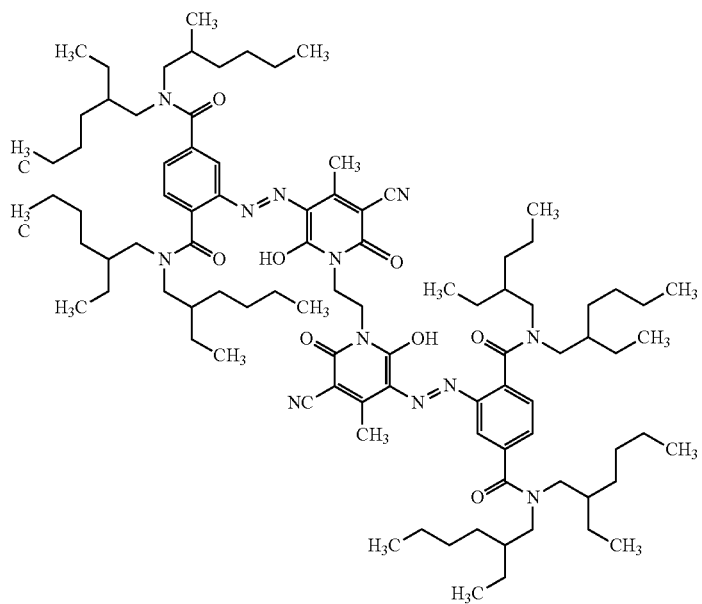
COMPOUND (11)
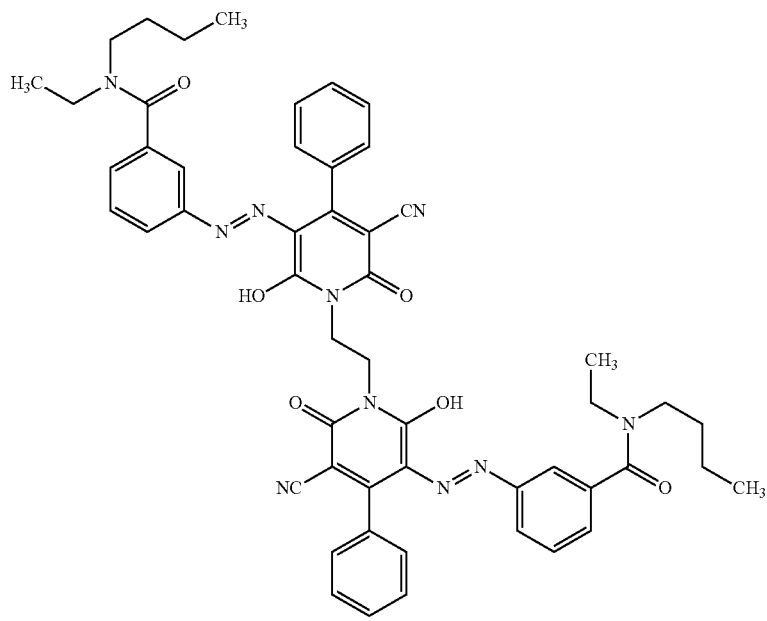

COMPOUND (12)
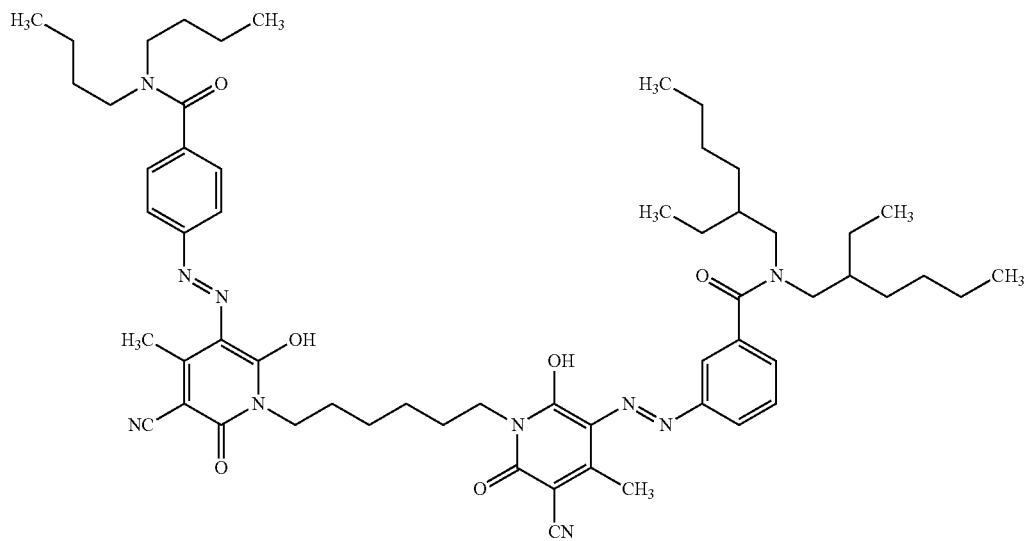
[Chem. 5]
COMPOUND (13)
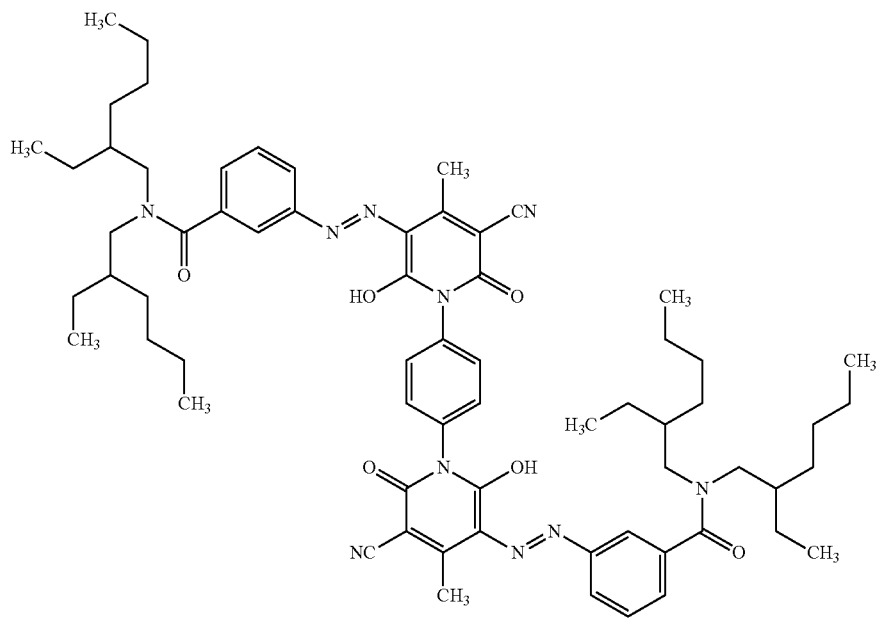

-continued
COMPOUND (14)
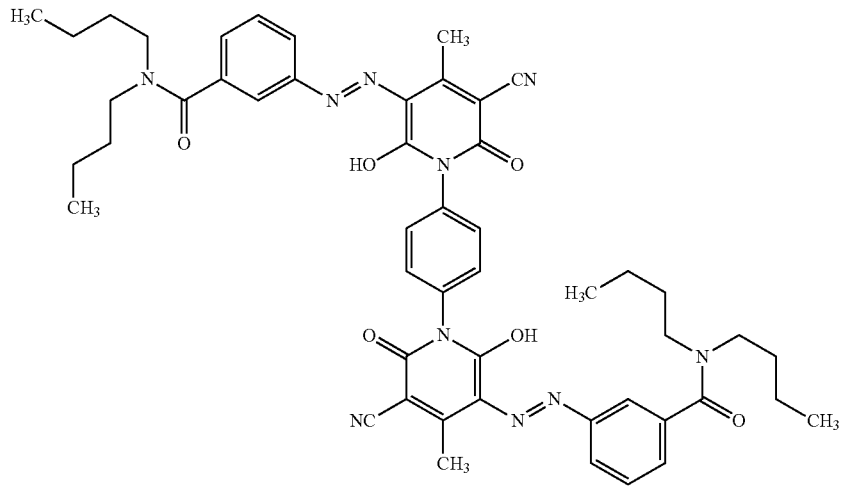
COMPOUND (15)
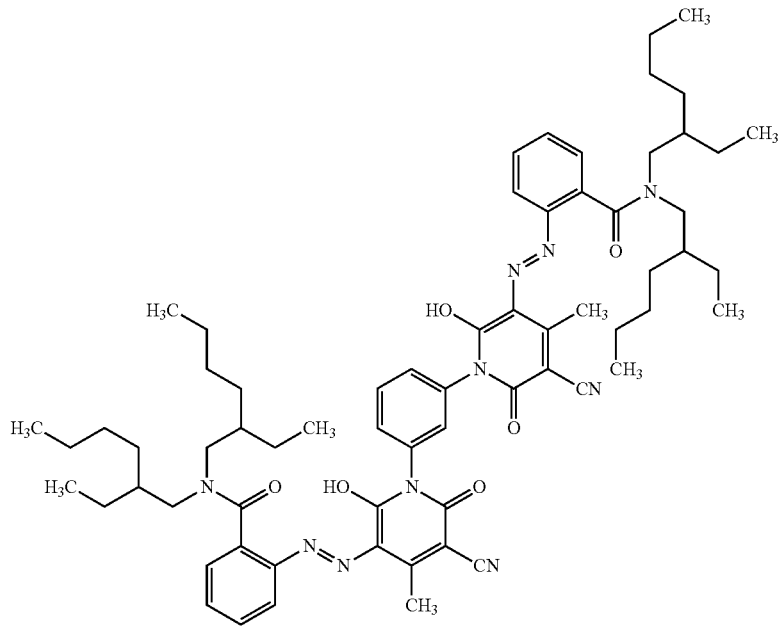
COMOUND (16)
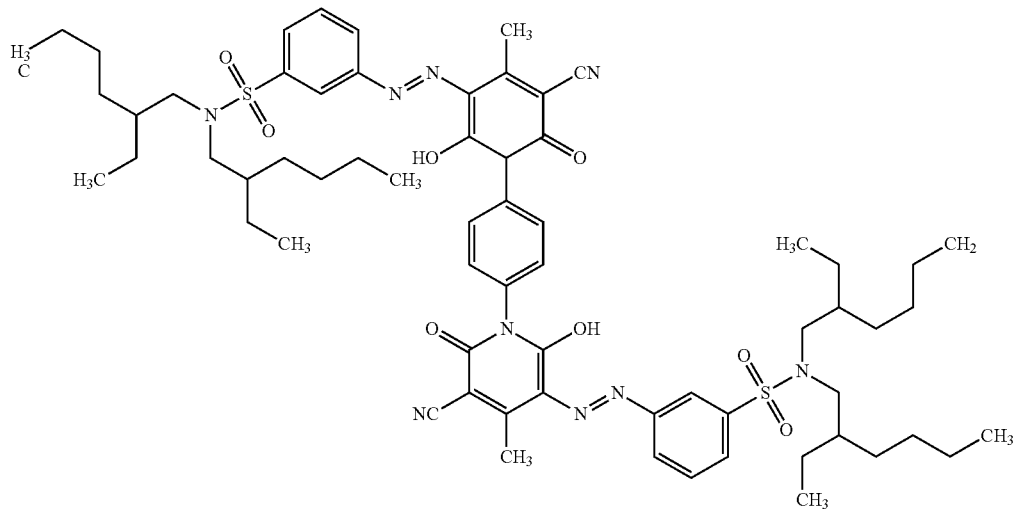

COMPOUND (17)
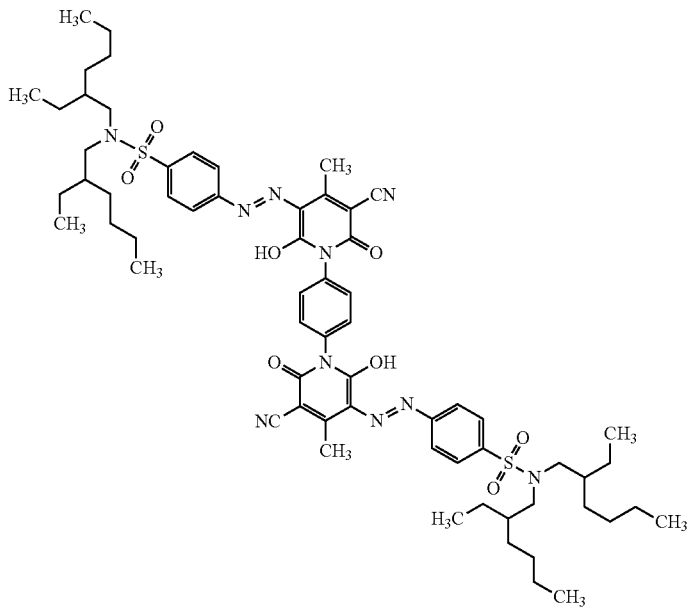
COMPOUND (18)
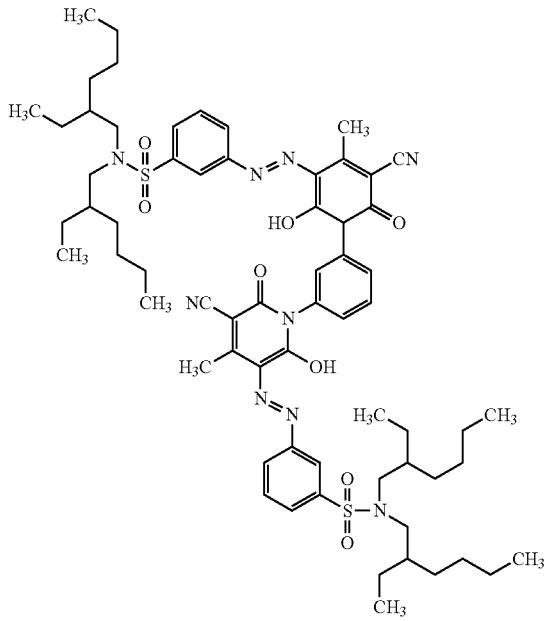

[Chem. 6]
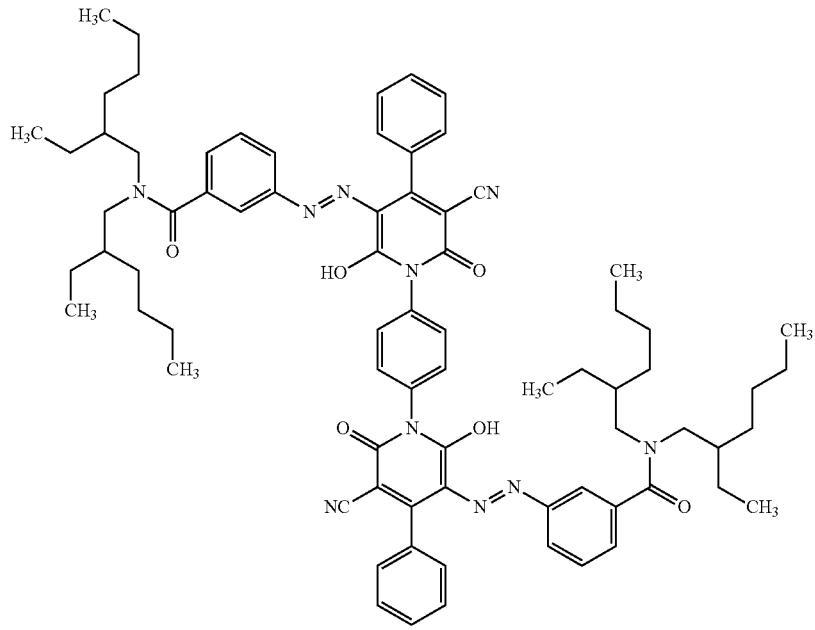
COMPOUND (19)
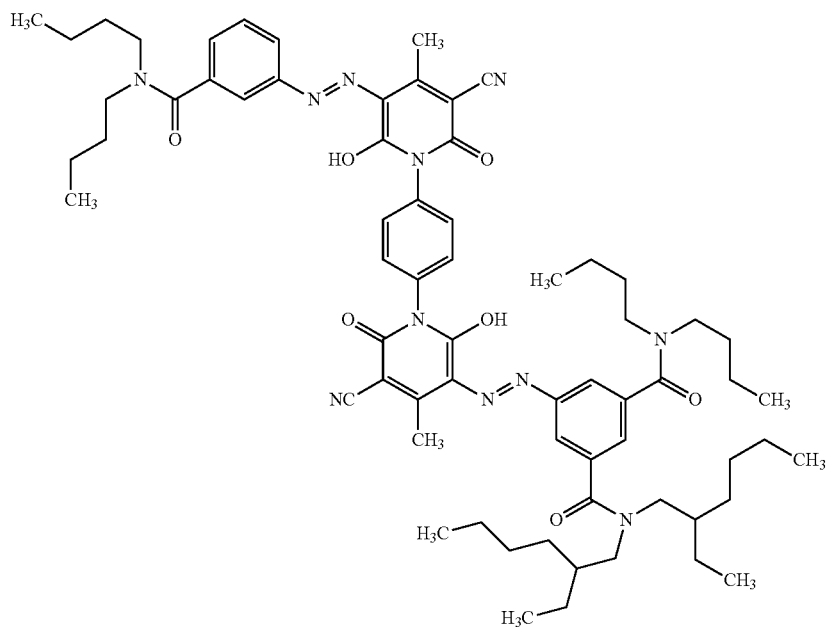
COMPOUND (20)

COMPOUND (21)
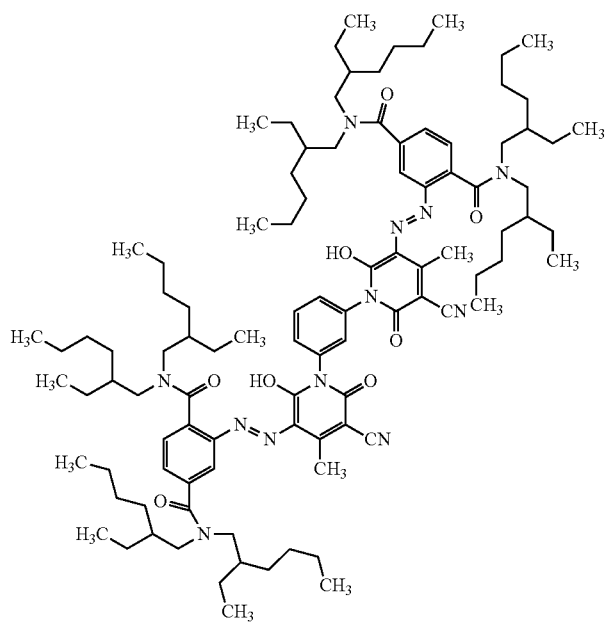
COMPOUND (22)
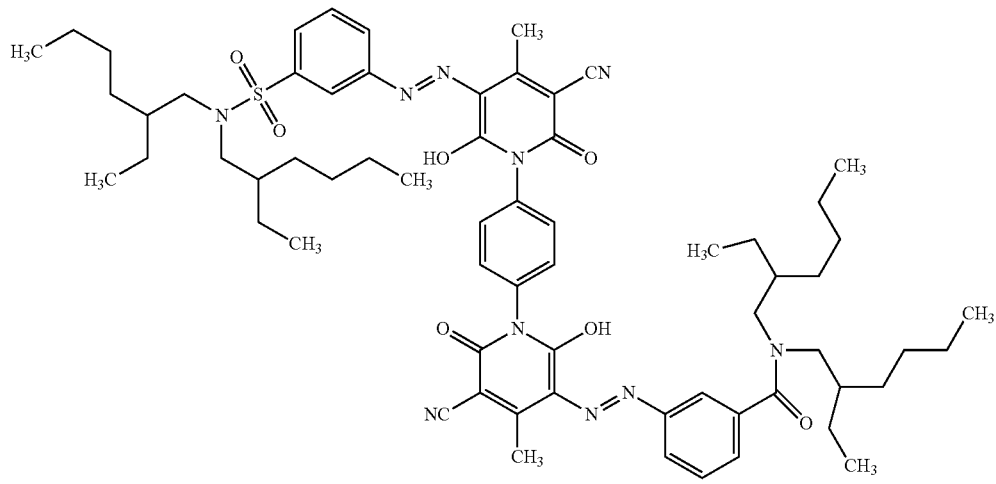
COMPOUND (23)
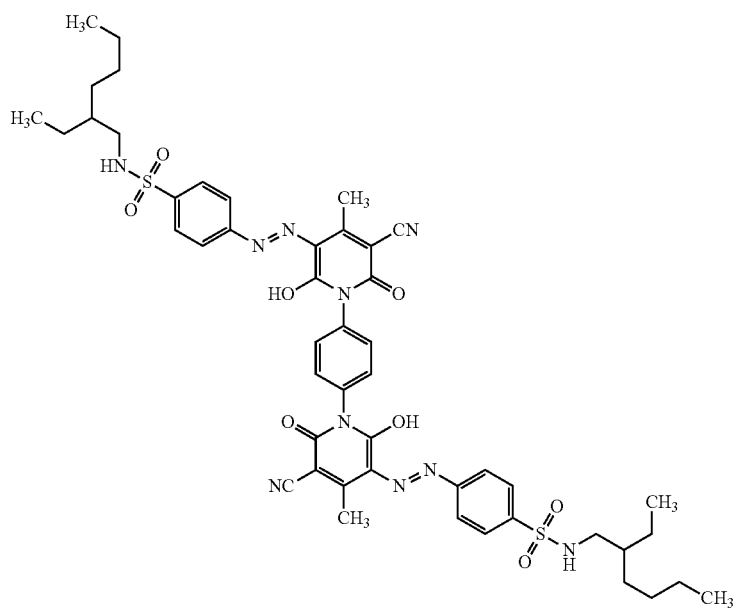

COMPOUND (24)
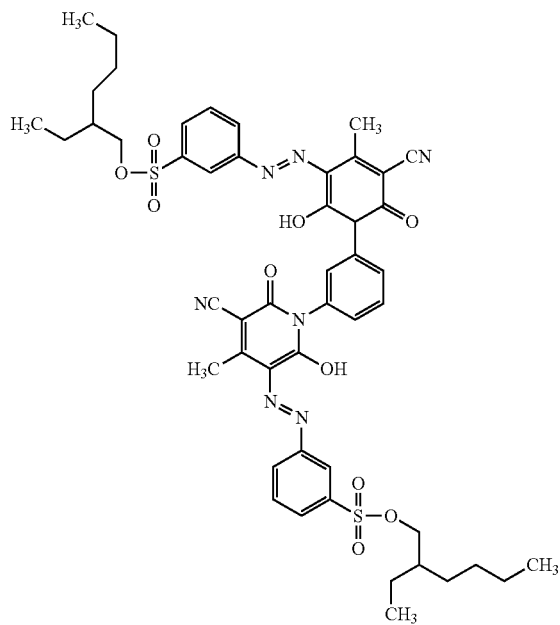
[Chem. 7]
COMPOUND (25)
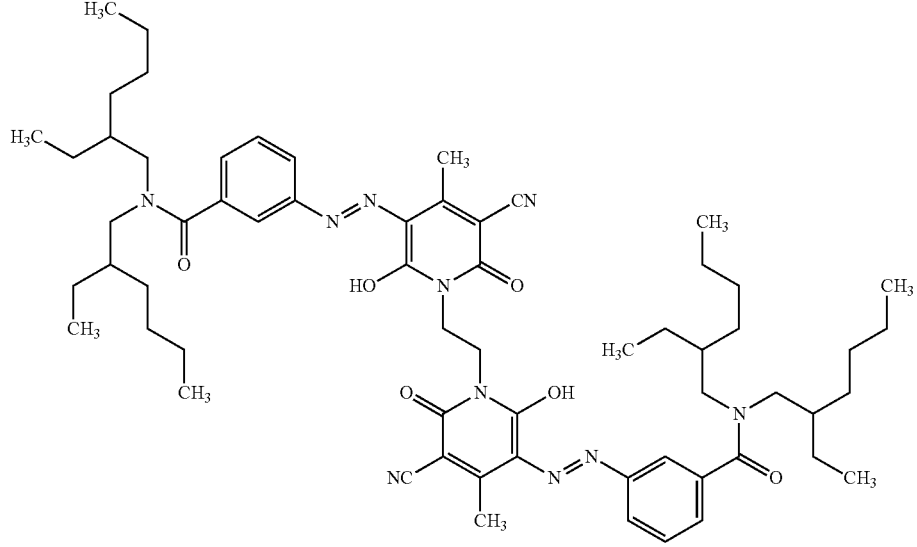

-continued
COMPOUND (26)
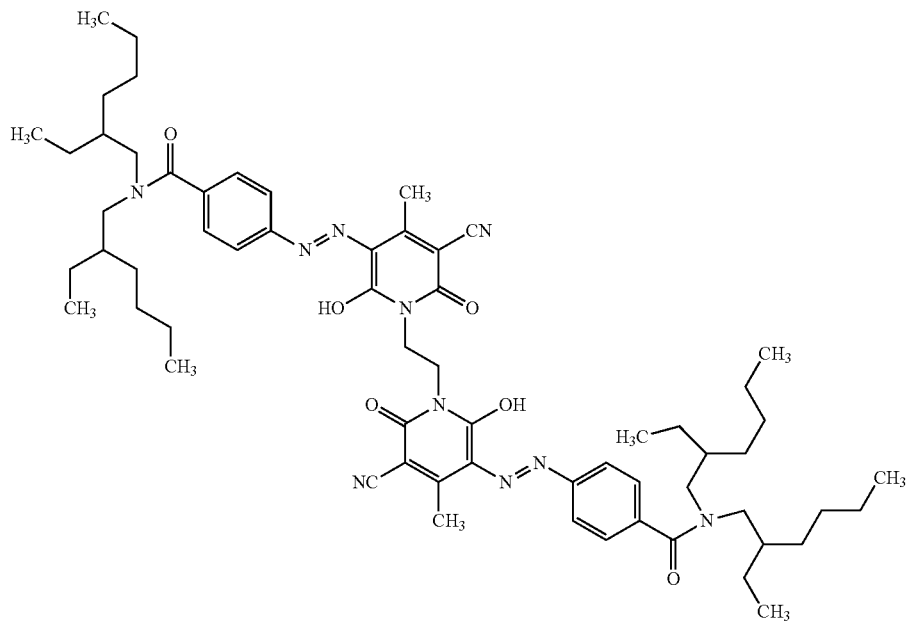
COMPOUND (27)
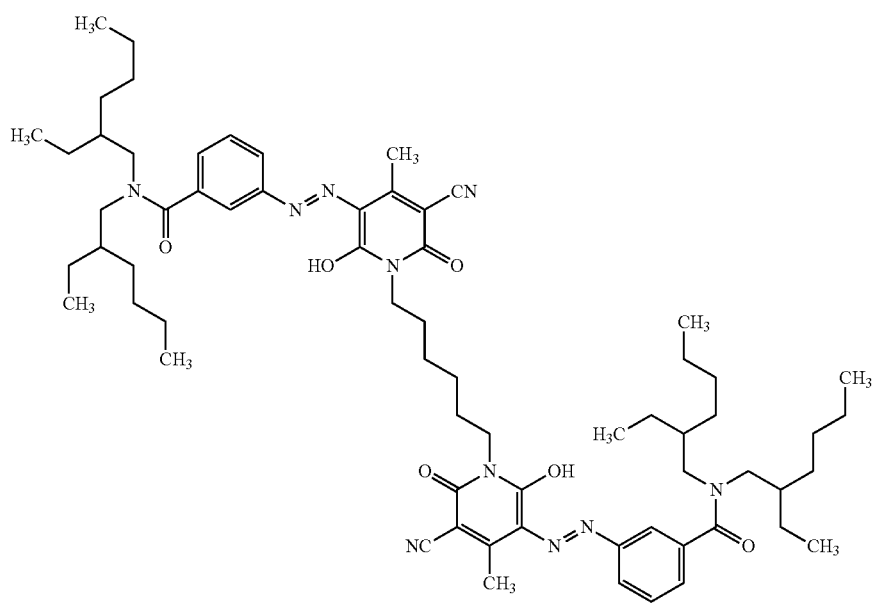

COMPOUND (28)
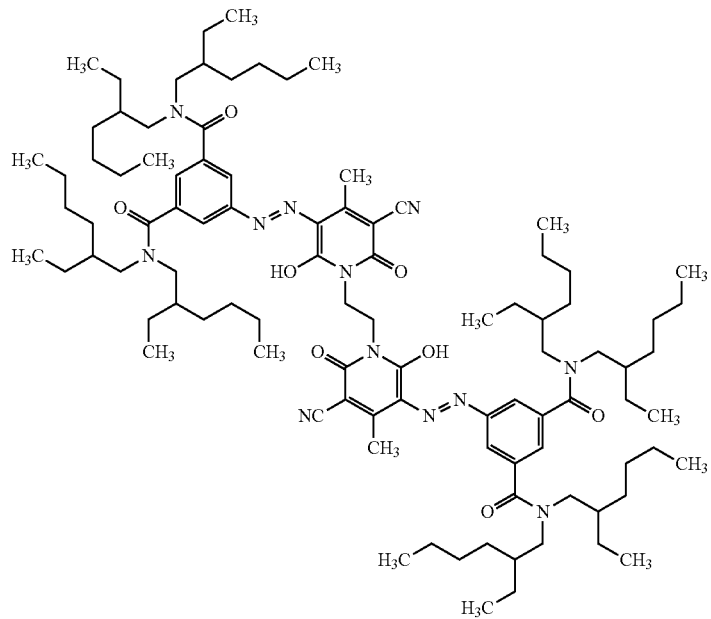
COMPOUND (29)
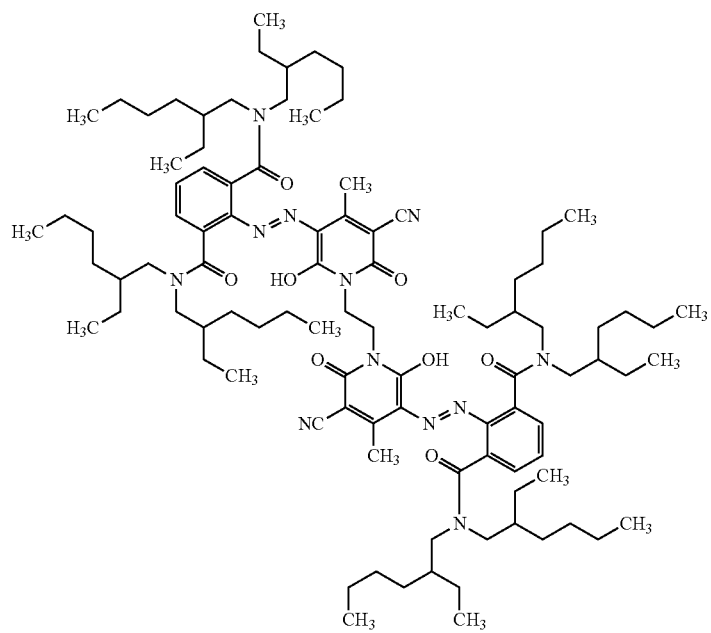

COMPOUND (30)
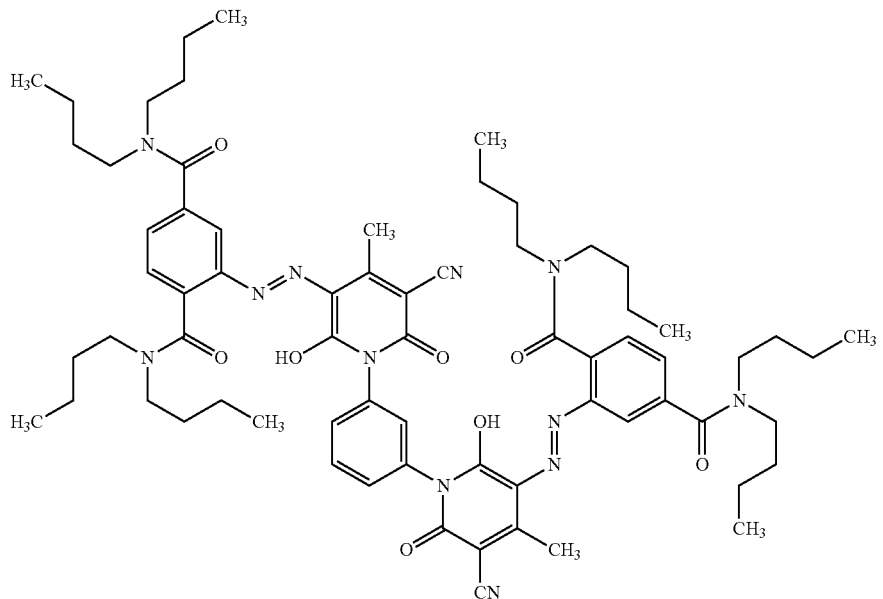
COMPOUND (31)
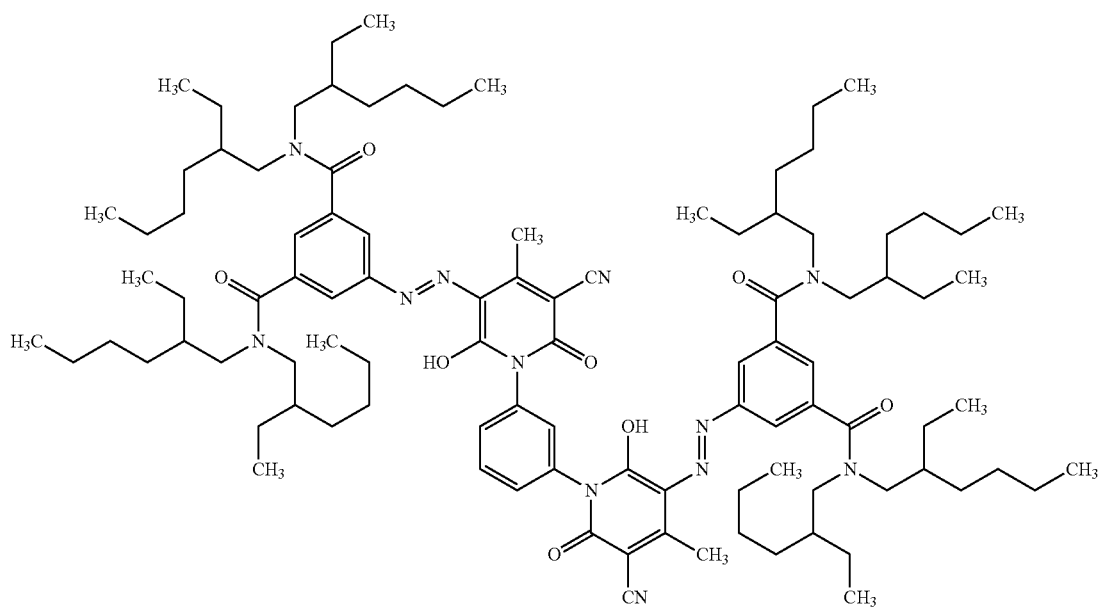

-continued
COMPOUND (32)
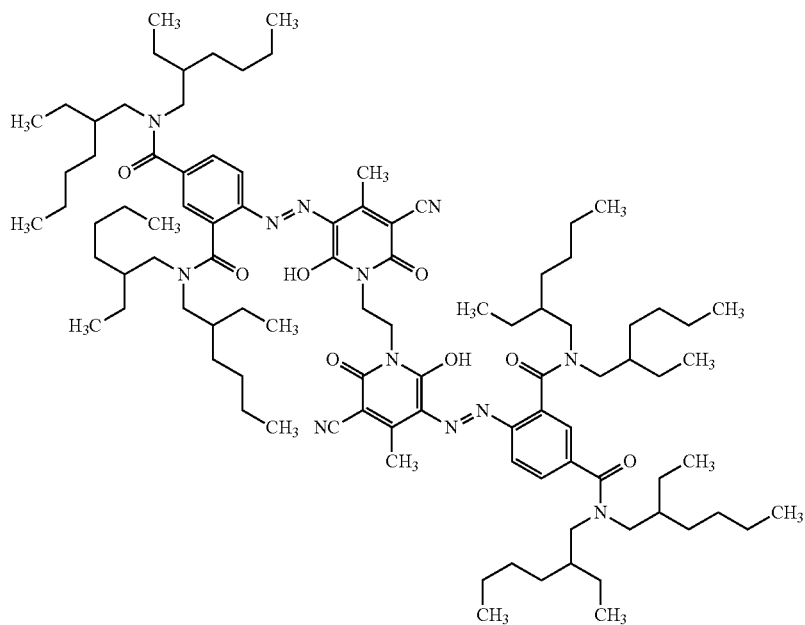
COMPOUND (33)
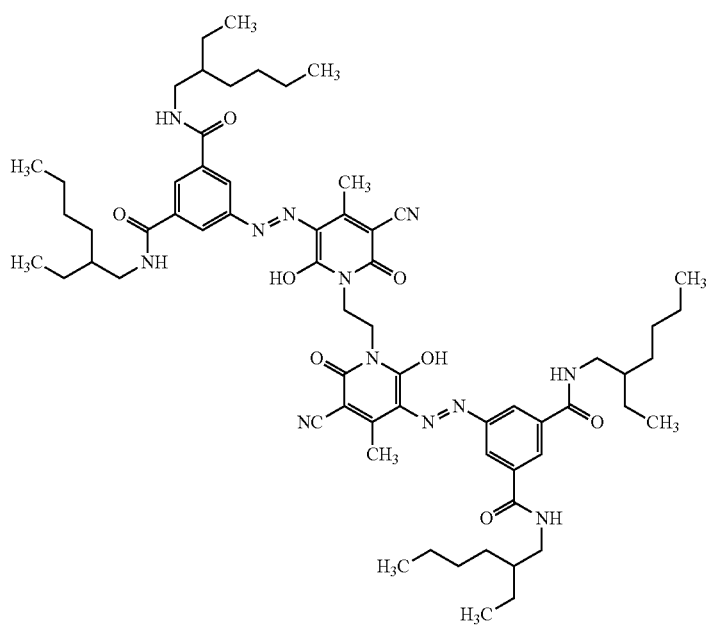

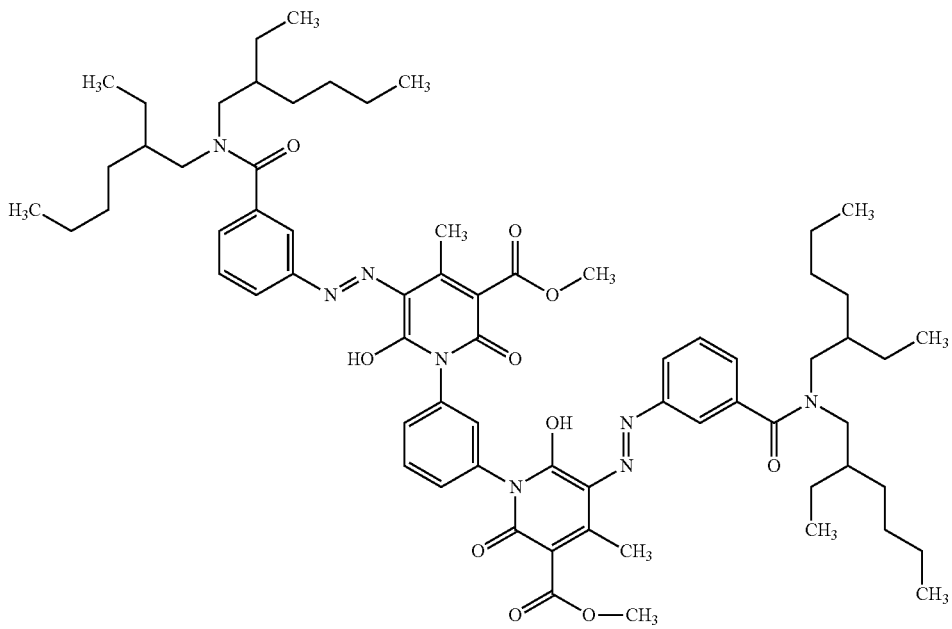

COMPOUND (34)

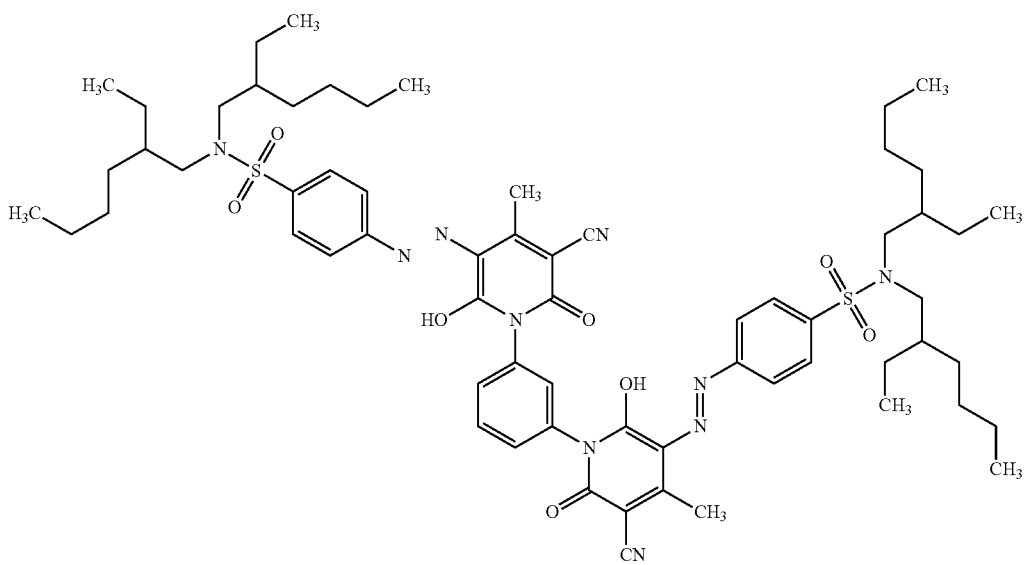

COMPOUND (35)

Ink

An ink according to an embodiment of the present invention will be described below.

The dye compound represented by the general formula (1) is excellent in both chroma and light fastness and thus may be used for an ink.

The ink according to an embodiment of the present invention contains the dye compound represented by the general formula (1) dissolved or dispersed in a medium.

In the ink according to an embodiment of the present invention, components other than described above are determined, depending on the application purpose of the ink according to an embodiment of the present invention. An additive may be appropriately added as long as the characteristics of various applications for which the ink is used are not impaired.

The ink according to an embodiment of the present invention may be used for inks for ink-jet printing, inks for printing, paints, and inks for writing instruments.

The ink according to an embodiment of the present invention is produced as described below.

The dye compound according to an embodiment of the present invention is slowly added to a medium under stirring optionally together with a colorant, an emulsifier, and a resin. The mixture is sufficiently stirred. A mechanical shear force is applied to the mixture with a disperser to stably dissolve or disperse the materials, thereby producing the ink according to an embodiment of the present invention.

In an embodiment of the present invention, the medium refers to water or an organic solvent.

In the case where an organic solvent is used as a medium for the ink according to an embodiment of the present invention, the type of organic solvent depends on the application purpose of the ink and is not particularly limited. Specific examples thereof include alcohols, such as methanol, ethanol, denatured ethanol, isopropanol, n-butanol, isobutanol, tert-butanol, sec-butanol, 2-methyl-2-butanol, 3-pentanol, octanol, benzyl alcohol, and cyclohexanol; glycols, such as methyl Cellosolve, ethyl Cellosolve, diethylene glycol, and diethylene glycol monobutyl ether; ketones, such as acetone, methyl ethyl ketone, and methyl isobutyl ketone; esters, such as ethyl acetate, butyl acetate, ethyl propionate, and Cellosolve acetate; aliphatic hydrocarbons, such as hexane, octane, petroleum ether, and cyclohexane; aromatic hydrocarbons, such as benzene, toluene, and xylene; halogenated hydrocarbons, such as carbon tetrachloride, trichloroethylene, and tetrabromoethane; ethers, such as diethyl ether, dimethyl glycol ether, trioxane, and tetrahydrofuran; acetals, such as methylal and diethyl acetal; organic acids, such as formic acid, acetic acid, and propionic acid; and sulfur- or nitrogen-containing organic compounds, such as nitrobenzene, dimethylamine, monoethanolamine, pyridine, dimethyl sulfoxide, and dimethylformamide.

Alternatively, a polymerizable monomer may also be used as an organic solvent that may be used for the ink according to an embodiment of the present invention. The polymerizable monomer is an addition-polymerizable monomer or a condensation-polymerizable monomer. In particular, an addition-polymerizable monomer may be used. Examples of the polymerizable monomer include styrene-based monomers, such as styrene, α-methylstyrene, α-ethylstyrene, o-methylstyrene, m-methylstyrene, p-methylstyrene, o-ethylstyrene, m-ethylstyrene, and p-ethylstyrene; acrylate-based monomers, such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide; methacrylate-based monomers, such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide; olefin-based monomers, such as ethylene, propylene, butylene, butadiene, isoprene, isobutylene, and cyclohexene; halogenated vinyl-based monomers, such as vinyl chloride, vinylidene chloride, vinyl bromide, and vinyl iodide; vinyl ester-based monomers, such as vinyl acetate, vinyl propionate, and vinyl benzoate; vinyl ether-based monomers, such as vinyl methyl ether, vinyl ethyl ether, and vinyl isobutyl ether; and vinyl ketone-based monomers, such as vinyl methyl ketone, vinyl hexyl ketone, and methyl isopropenyl ketone. These compounds may be used separately or in combination of two or more, as needed.

The ink according to an embodiment of the present invention contains the dye compound represented by the general formula (1). Other colorants may be optionally used in combination as long as the solubility or dispersibility of the dye compound in the medium is not inhibited.

Examples of other colorants that may be used include, but are not limited to, various colorants, such as C.I. Solvent Yellow 1, 19, 44, 49, 62, 74, 77, 79, 81, 82, 83, 89, 90, 93, 98, 103, 104, 112, 120, 121, 151, 153, 154, and 162, C.I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 150, 151, 154, 155, 167, 168, 173, 174, 176, 180, 181, 183, 185, and 191, and derivatives thereof.

The content of the dye compound represented by the general formula (1) in the ink according to an embodiment of the present invention is preferably 1.0 part by mass to 30 parts by mass, more preferably 2.0 parts by mass to 20 parts by mass, and still more preferably 3.0 parts by mass to 15 parts by mass with respect to 100 parts by mass of the medium. When the dye compound content is within the range described above, satisfactory dispersibility of the dye compound is provided while sufficient tinting power is provided.

In the case where water is used as a medium for the ink according to an embodiment of the present invention, an emulsifier may be optionally added in order to satisfactory dispersion stability of the dye compound. Examples of the emulsifier that may be added include, but are not particularly limited to, cationic surfactants, anionic surfactants, and nonionic surfactants.

Examples of the cationic surfactants include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactants include fatty acid soaps, such as sodium stearate and sodium dodecanoate, sodium dodecyl sulfate, sodium dodecylbenzene sulfate, and sodium lauryl sulfate.

Examples of the nonionic surfactants include polyoxyethylene dodecyl ether, polyoxyethylene hexadecyl ether, polyoxyethylene nonylphenyl ether, polyoxyethylene lauryl ether, sorbitan monooleate polyoxyethylene ether, and monodecanoyl sucrose.

The ink according to an embodiment of the present invention may further contain a resin. The type of resin that may be contained in the ink according to an embodiment of the present invention depends on the application purpose. Examples of the resin include, but are not particularly limited to, polystyrene resins, styrene copolymers, polyacrylic resins, polymethacrylic resins, polyacrylate resins, polymethacrylate resins, acrylic-based copolymers, methacrylic-based copolymers, polyester resins, polyvinyl ether resins, polyvinyl methyl ether resins, polyvinyl alcohol resins, polyvinyl butyral resins, polyurethane resins, and polypeptide resins. These resins may be used separately or in combination of two or more, as needed.

Examples of the disperser used in a process for preparing an ink include, but are not particularly limited to, rotary-shear homogenizers, media-type dispersers, e.g., ball mills, sand mills, and attritors, and high-pressure counter collision-type dispersers.

As described above, the ink according to an embodiment of the present invention contains the dye compound according to an embodiment of the present invention and thus has high chroma and high light fastness.

Resist Composition for Color Filter

A resist composition according to an embodiment of the present invention will be described below.

The dye compound according to an embodiment of the present invention is excellent in both chroma and the light fastness and thus may be used for the resist composition for a color filter.

The resist composition for a color filter according to an embodiment of the present invention contains a binder resin, the dye compound according to an embodiment of the present invention, and a medium, in which the binder resin and the dye compound are dispersed or dissolved in the medium.

The resist composition for a color filter according to an embodiment of the present invention is prepared as described below.

The dye compound and the binder resin are added to the medium under stirring. At this time, a polymerizable monomer, a polymerization initiator, and a photoacid generator may be added, as needed. A mechanical shear force is applied to the mixture with a disperser to produce a state in which the materials are stably dissolved or dispersed in the medium, thereby preparing the resist composition for a color filter according to an embodiment of the present invention.

The binder resin that may be used for the resist composition for a color filter according to an embodiment of the present invention may be such that one of a light-irradiated portion and a light-shielded portion of the binder resin is soluble in an organic solvent, an aqueous alkaline solution, water, or a commercially available developing solution in an exposure step upon forming pixels. In view of workability and treatment after the formation of a resist, the binder resin may have a composition developable with water or an aqueous alkaline solution.

As the binder resin, a binder resin may be used in which a hydrophilic polymerizable monomer, for example, acrylic acid, methacrylic acid, N-(2-hydroxyethyl)acrylamide, N-vinylpyrrolidone, or an ammonium salt, and a lipophilic polymerizable monomer, for example, an acrylate, a methacrylate, vinyl acetate, styrene, or N-vinylcarbazole, are copolymerized by a known method in an appropriate mixing ratio. The binder resin may be used as a negative resist which contains a combination of an ethylenically unsaturated group-containing radically polymerizable monomer, a cationically polymerizable monomer containing an oxirane ring or an oxetane ring, a radical generator, an acid generator, and a base generator and in which an exposed portion of the resist has low solubility in a developing solution, so that only the light-shielded portion is removed by development.

Alternatively, a resin containing a quinone diazide group cleavable by light to form a carboxy group, a resin, such as poly(hydroxystyrene) protected with a tert-butoxycarbonyl group or a tetrahydropyranyl group, containing a group cleavable by acid, and an acid generator that generates an acid by exposure may also be used in combination. Such a binder resin may be used as a positive resist in which an exposed portion of the resist has high solubility in a developing solution, so that only the exposed portion is removed by development.

In the case where the resist composition for a color filter according to an embodiment of the present invention is the foregoing negative resist composition, a polymerizable monomer that is addition-polymerizable by exposure (hereinafter, also referred to as a "photopolymerizable monomer") may be used. As the photopolymerizable monomer, a compound containing at least one ethylenically unsaturated addition-polymerizable double bond in its molecule and having a boiling point of 100° C. or higher at normal atmospheric pressure may be used. Specific examples thereof include monofunctional acrylates, such as polyethylene glycol monoacrylate, polyethylene glycol monomethacrylate, polypropylene glycol monoacrylate, polypropylene glycol monomethacrylate, phenoxyethyl acrylate, and phenoxyethyl methacrylate; polyfunctional acrylates and polyfunctional methacrylates, such as polyethylene glycol diacrylate, polyethylene glycol dimethacrylate, polypropylene glycol diacrylate, polypropylene glycol dimethacrylate, trimethylolethane triacrylate, trimethylolethane trimethacrylate, trimethylolpropane triacrylate, trimethylolpropane trimethacryalte, trimethylolpropane diacrylate, trimethylolpropane dimethacrylate, neopentyl glycol diacrylate, neopentyl glycol dimethacrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, dipentaerythritol pentaacrylate, dipentaerythritol pentamethacrylate, hexanediol diacrylate, hexanediol dimethacrylate, trimethylolpropane tri(acryloyloxypropyl) ether, tri(acryloyloxyethyl) isocyanurate, tri(acryloyloxyethyl) cyanurate, glycerol triacrylate, and glycerol trimethacrylate; and polyfunctional acrylates and polyfunctional methacrylates each prepared by the addition of ethylene oxide or propylene oxide to a polyfunctional alcohol, for example, trimethylolpropane or glycerol, and then the acrylation or methacrylation of the resulting compound. Further examples thereof include polyfunctional epoxy acrylates and polyfunctional epoxy methacrylates, each of which is a reaction product of a urethane acrylate, a polyester acrylate, or an epoxy resin with acrylic acid or methacrylic acid. Of these, trimethylolpropane triacrylate, trimethylolpropane trimethacrylate, pentaerythritol tetraacrylate, pentaerythritol tetramethacrylate, dipentaerythritol hexaacrylate, dipentaerythritol hexamethacrylate, dipentaerythritol pentaacrylate, or dipentaerythritol pentamethacrylate may be used.

The photopolymerizable monomers may be used separately or in combination of two or more, as needed.

The content of the photopolymerizable monomer is preferably 5% to 50% by mass and more preferably 10% to 40% by mass with respect to the mass (total solid content) of the resist composition according to an embodiment of the present invention. A content of 5% to 50% by mass may lead to improvements in sensitivity to exposure and the strength of pixels and may lead to proper adhesion of the resist composition.

In the case where the resist composition for a color filter according to an embodiment of the present invention is the foregoing negative resist composition, a photoinitiator may be added. Examples of the photoinitiator include vicinal polyketoaldonyl compounds, α-carbonyl compounds, acyloin ethers, multinuclear quinone compounds, a combination of triallyl imidazole dimer with p-aminophenyl ketone, and trioxadiazole compounds. Of these, 2-benzyl-2-dimethylamino-1-(4-morpholinophenyl)butanone (trade name: IRGACURE 369, manufactured by BASF) may be used. In the case where an electron beam is used for the formation of pixels with the colored resist according to an embodiment of the present invention, the foregoing photoinitiator is not necessarily used.

In the case where the resist composition for a color filter according to an embodiment of the present invention is the foregoing positive resist composition, a photoacid generator may be added, as needed. As the photoacid generator, known photoacid generators, which are salts of onium ions, such as sulfonium, iodonium, selenium, ammonium, and phosphonium ions, and anions, may be used.

Examples of the sulfonium ions include triphenylsulfonium, tri-p-tolylsulfonium, tri-o-tolylsulfonium, tris(4-methoxyphenyl)sulfonium, 1-naphthyldiphenylsulfonium, diphenylphenacylsulfonium, phenylmethylbenzylsulfonium, 4-hydroxyphenylmethylbenzylsulfonium, dimethylphenacylsulfonium, and phenacyltetrahydrothiophenium ions.

Examples of the iodonium ions include diphenyliodonium, di-p-tolyliodonium, bis(4-dodecylphenyl)iodonium, bis(4-methoxyphenyl)iodonium, and (4-octyloxyphenyl)phenyliodonium ions.

Examples of the selenium ions include triarylselenium ions, such as triphenylselenium, tri-p-tolylselenium, tri-o-tolylselenium, tris(4-methoxyphenyl)selenium, 1-naphthyldiphenylselenium, tris(4-fluorophenyl)selenium, tri-1-naphthylselenium, and tri-2-naphthylselenium ions.

Examples of the ammonium ions include tetraalkylammonium ions, such as tetramethylammonium, ethyltrimethylammonium, diethyldimethylammonium, triethylmethylammonium, tetraethylammonium, trimethyl-n-propylammonium, trimethylisopropylammonium, trimethyl-n-butylammonium, and trimethylisobutylammonium ions.

Examples of the phosphonium ions include tetraphenylphosphonium, tetra-p-tolylphosphonium, tetrakis(2-methoxyphenyl)phosphonium, triphenylbenzylphosphonium, triphenylphenacylphosphonium, triphenylmethylphosphonium, triethylbenzylphosphonium, and tetraethylphosphonium ions.

Examples of the anions that may be used include, but are not limited to, perhalide ions, such as $ClO_4^-$ and $BrO_4^-$; halogenated sulfonate ions, such as $FSO_3^-$ and $ClSO_3^-$; sulfate ions, such as $CH_3SO_4^-$, $CF_3SO_4^-$, and $HSO_4^-$; carbonate ions, such as $HCO_3^-$ and $CH_3CO_3^-$; aluminate ions, such as $AlCl_4^-$ and $AlF_4^-$; hexafluorobismuthate ions; carboxylate ions, such as $CH_3COO-$, $CF_3COO-$, $C_6H_5COO-$, $CH_3C_6H_4COO-$, $C_6F_5COO-$, and $CF_3C_6H_4COO-$; arylborate ions, such as $B(C_6H_5)_4^-$ and $CH_3CH_2CH_2CH_2B(C_6H_5)_3^-$; thiocyanate ions; and nitrate ions.

In the resist composition for a color filter according to an embodiment of the present invention, water or an organic solvent may be used as the medium to dissolve or disperse the dye compound, the binder resin, and, optionally, the photopolymerizable monomer, the photoinitiator, and the photoacid generator. Examples of the organic solvent include cyclohexanone, ethyl Cellosolve acetate, butyl Cellosolve acetate, 1-methoxy-2-propyl acetate, diethylene glycol dimethyl ether, ethylbenzene, 1,2,4-trichlorobenzene, ethylene glycol diethyl ether, xylene, ethyl Cellosolve, methyl n-amyl ketone, propylene glycol monomethyl ether, toluene, methyl ethyl ketone, ethyl acetate, methanol, ethanol, isopropanol, butanol, methyl isobutyl ketone, and petroleum solvents. These solvents may be used separately or in combination of two or more. The medium used for the resist composition for a color filter according to an embodiment of the present invention may be the same or different from the medium used for the dye compound as long as the dispersibility of the dye compound is not inhibited.

For a color filter in which two or more types of pixels having different spectral properties are arranged in adjacent positions, among a plurality of colors (for example, red, green, and blue) of pixels, in the case where the resist composition according to an embodiment of the present invention is used for the pixels of at least one color, the color filter is excellent in chroma and light fastness. To provide desired spectral properties, an additional dye may be used in combination for tone adjustment. Examples of the dye that may be used in combination include, but are not particularly limited to, C.I. Solvent Blue 14, 24, 25, 26, 34, 37, 38, 39, 42, 43, 44, 45, 48, 52, 53, 55, 59, 67, and 70; and C.I. Solvent Red 8, 27, 35, 36, 37, 38, 39, 40, 49, 58, 60, 65, 69, 81, 83:1, 86, 89, 91, 92, 97, 99, 100, 109, 118, 119, 122, 127, and 218.

The resist composition for a color filter according to an embodiment of the present invention may optionally further contain an ultraviolet absorber and a silane coupling agent in order to improve adhesion with a glass substrate upon producing a filter, in addition to the foregoing additives.

As described above, the resist composition for a color filter according to an embodiment of the present invention contains the dye compound according to an embodiment of the present invention and thus is excellent in both chroma and light fastness.

EXAMPLES

While the present invention will be described in more detail below by examples and comparative examples, the present invention is not limited to these examples. In the description, "part(s)" and "%" are expressed on a mass basis unless otherwise specified. The resulting reaction products are identified with a ¹H-nuclear magnetic resonance (¹H-NMR) spectrometer (ECA-400, manufactured by JEOL Ltd.) and a matrix-assisted laser desorption-ionization mass spectrometer (MALDI-TOF-MS) (Model: autoflex, manufactured by Bruker Daltonics). In MALDI-TOF-MS, ions were detected in a negative ion mode.

Example 1

Preparation of Compound (1)

[Chem. 8]

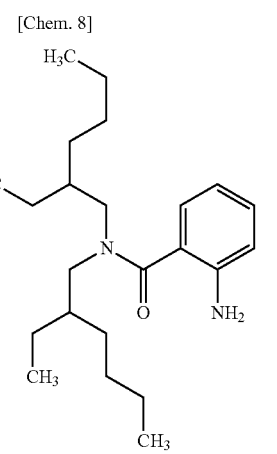

AMINE COMPOUND (1)

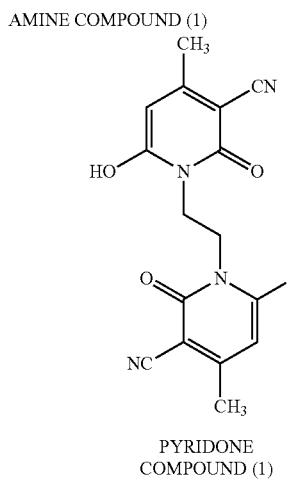

PYRIDONE COMPOUND (1)

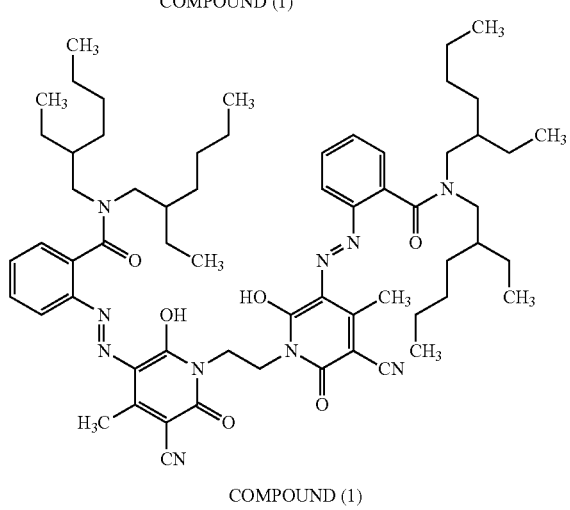

COMPOUND (1)

A solution of 2 g of amine compound (1) in 40 mL of methanol (MeOH) was cooled to 5° C. To the solution, 1.7 mL of 35% hydrochloric acid was added dropwise. An aqueous solution of 0.48 g of sodium nitrite in 9 mL of water was added dropwise thereto (diazotized solution A). Separately, a solution of 0.90 g of pyridone compound (1) in 20 mL of methanol (MeOH) was cooled to 5° C. Diazotized solution A was slowly added dropwise thereto in such a manner that the temperature of the resulting mixture was maintained at 5° C. or lower. The mixture was stirred at 0° C. to 5° C. for another 3 hours. After the completion of the reaction, an aqueous solution of sodium carbonate was added dropwise to adjust the pH to 6. The mixture was extracted with chloroform. The resulting viscous liquid was purified by column chromatography (eluent: heptane/ethyl acetate) to give 1.73 g of compound (1).

Analysis Result of Compound (1)

[1] $^1$H-NMR (400 MHz, CDCl$_3$, room temperature): δ (ppm)=14.90 (2H, s), 7.83 (2H, d), 7.46 (2H, t), 7.29-7.22 (4H, m), 4.35-4.31 (4H, m), 3.24-3.20 (4H, m), 2.60 (6H, s), 1.83-1.80 (8H, m), 1.66-1.32 (18H, m), 1.28-0.83 (28H, m), 0.79-0.69 (5H, m), 0.66-0.60 (5H, m)

[2] Mass spectrometric analysis by MALDI-TOF-MS: m/z=1067.363 (M−2H)2$^-$

Example 2

Preparation of Compound (25)

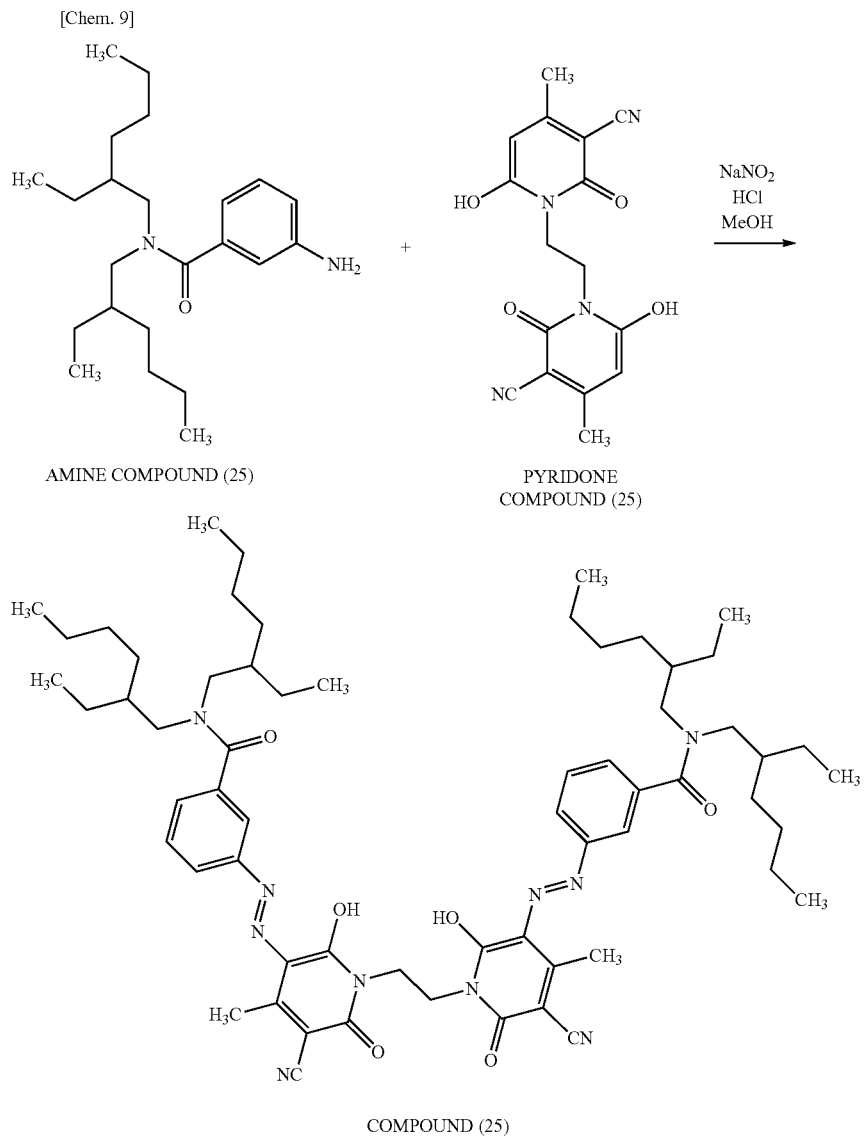

[Chem. 9]

AMINE COMPOUND (25)    PYRIDONE COMPOUND (25)

COMPOUND (25)

A solution of 2 g of amine compound (25) in 40 mL of methanol (MeOH) was cooled to 5° C. To the solution, 1.7 mL of 35% hydrochloric acid was added dropwise. An aqueous solution of 0.48 g of sodium nitrite in 9 mL of water was added dropwise thereto (diazotized solution A). Separately, a solution of 0.90 g of pyridone compound (25) in 20 mL of methanol (MeOH) was cooled to 5° C. Diazotized solution A was slowly added dropwise thereto in such a manner that the temperature of the resulting mixture was maintained at 5° C. or lower. The mixture was stirred at 0° C. to 5° C. for another 3 hours. After the completion of the reaction, an aqueous solution of sodium carbonate was added dropwise to adjust the pH to 6. The mixture was extracted with chloroform. The resulting viscous liquid was purified by column chromatography (eluent: heptane/ethyl acetate) to give 1.48 g of compound (25).

Analysis Result of Compound (25)

[1] $^1$H-NMR (400 MHz, CDCl$_3$, room temperature): δ (ppm)=14.90 (2H, s), 7.53-7.48 (6H, m), 7.29-7.25 (2H, m), 4.36 (4H, s), 3.52-3.32 (4H, m), 3.19 (4H, d), 2.61 (6H, s), 1.86-1.77 (2H, m), 1.60-1.50 (2H, m), 1.48-1.29 (16H, m), 1.28-1.17 (6H, m), 1.16-1.02 (10H, m), 1.01-0.88 (12H, m), 0.86-0.81 (6H, m), 0.76-0.68 (6H, m)

[2] Mass spectrometric analysis by MALDI-TOF-MS: m/z=1069.159 (M)

Example 3

Preparation of Compound (26)

A solution of 2 g of amine compound (26) in 40 mL of methanol (MeOH) was cooled to 5° C. To the solution, 6.9 mL of sulfuric acid and 1.76 mL of a 40% nitrosylsulfuric acid solution were slowly added dropwise (diazotized solution B). Separately, a solution of 0.90 g of pyridone compound (26) in 20 mL of methanol (MeOH) was cooled to 5° C. Diazotized solution B was slowly added dropwise thereto in such a manner that the temperature of the resulting mixture was maintained at 5° C. or lower. The mixture was stirred at 0° C. to 5° C. for another 3 hours. After the completion of the reaction, the mixture was extracted with chloroform. The chloroform layer was concentrated to form a solid. The resulting solid was purified by column chromatography (eluent: heptane/ethyl acetate) to give 1.48 g of compound (26).

Analysis Result of Compound (26)

[1] $^1$H-NMR (400 MHz, CDCl$_3$, room temperature): δ (ppm)=14.90 (2H, s), 7.53-7.48 (8H, m), 4.36 (4H, s), 3.46-3.35 (4H, m), 3.22-3.18 (4H, m), 2.63 (6H, s), 1.86-1.77 (2H, m), 1.60-1.47 (2H, m), 1.45-1.00 (28H, m), 0.98-0.78 (18H, m), 0.76-0.65 (6H, m)

[Chem. 10]

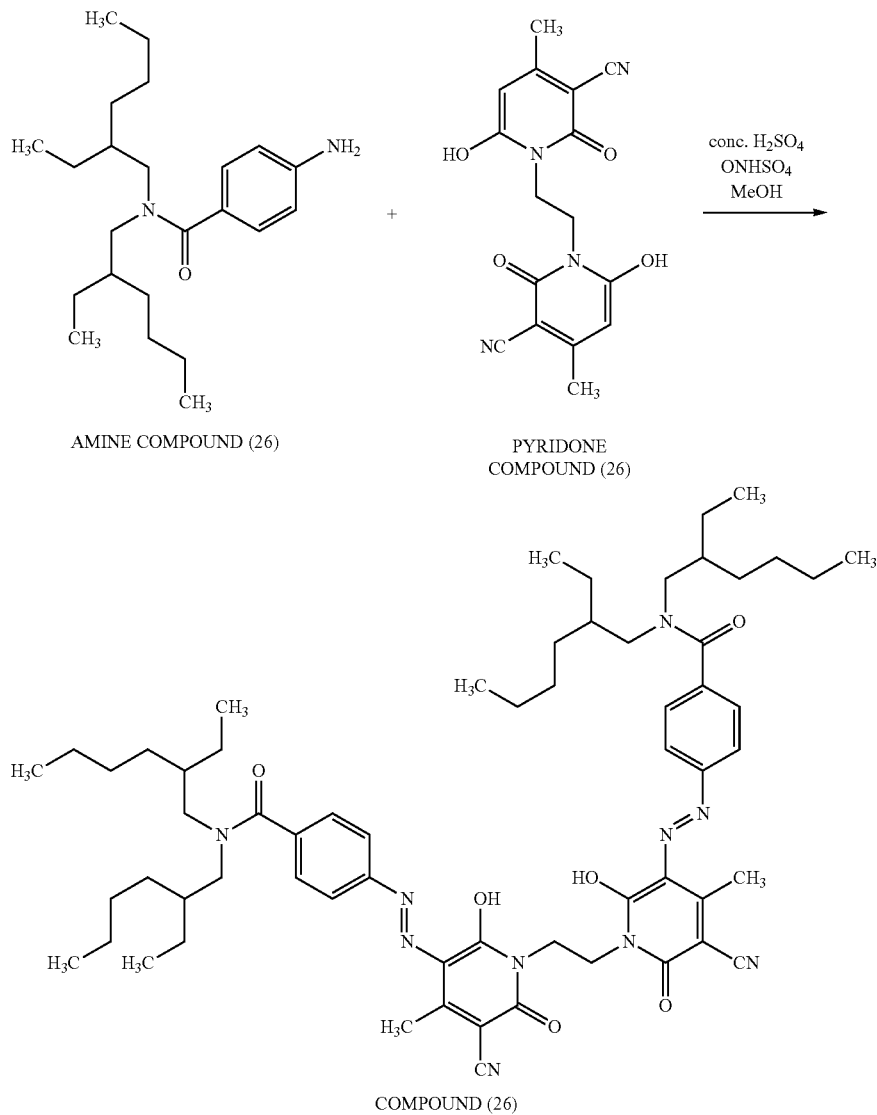

[2] Mass spectrometric analysis by MALDI-TOF-MS: m/z=1069.068 (M)

Examples 4 and 5

Preparation of Compounds (2) and (10)

Compounds (2) and (10) were prepared in the same way as in Example 1, except that in each of the examples, an amine compound corresponding to amine compound (1) and a pyridone compound corresponding to pyridone compound (1) were used in place of amine compound (1) and pyridone compound (1).

The resulting compounds were identified as having target structures by the analyses.
Analysis Result of Compound (10)

[1] $^1$H-NMR (400 MHz, CDCl$_3$, room temperature): δ (ppm)=14.95 (2H, s), 7.80 (2H, s), 7.33 (2H, d), 7.26 (2H, d), 4.33 (4H, s), 3.74-3.28 (6H, m), 3.24-3.12 (8H, m), 2.56 (6H, s), 1.84-0.68 (122H, m)

[2] Mass spectrometric analysis by MALDI-TOF-MS: m/z=1604.218 (M)

Examples 6 to 11

Preparation of Compounds (15), (21), (24), (28), (29), and (31)

Compounds (15), (21), (24), (28), (29), and (31) were prepared in the same way as in Example 3, except that in each of the examples, an amine compound corresponding to amine compound (26) and a pyridone compound corresponding to pyridone compound (26) were used in place of amine compound (26) and pyridone compound (26).

The resulting compounds were identified as having target structures by the analyses.
Analysis Result of Compound (21)

[1] $^1$H-NMR (400 MHz, CDCl$_3$, room temperature): δ (ppm)=14.80 (2H, s), 7.82 (2H, s), 7.59 (1H, t), 7.30-7.27 (4H, m), 7.21 (2H, d), 7.06 (1H, s), 3.46 (6H, d), 3.17 (8H, t), 2.64 (6H, s), 1.85-0.62 (122H, m)

[2] Mass spectrometric analysis by MALDI-TOF-MS: m/z=1653.266 (M)

Analysis Result of Compound (28)

[1] $^1$H-NMR (400 MHz, CDCl$_3$, room temperature): δ (ppm)=14.88 (2H, s), 7.49 (4H, s), 7.18 (2H, s), 4.35 (4H, s), 3.45 (8H, dd), 3.18 (6H, d), 2.59 (6H, s), 1.91-1.70 (4H, br), 1.62-0.72 (122H, m)

[2] Mass spectrometric analysis by MALDI-TOF-MS: m/z=1605.323 (M)

Analysis Result of Compound (29)

[1] $^1$H-NMR (400 MHz, CDCl$_3$, room temperature): δ (ppm)=14.99 (2H, s), 7.33-7.27 (6H, m), 4.30 (4H, s), 3.04 (8H, s), 2.51 (6H, s), 1.76-1.71 (3H, br), 1.58 (9H, s), 1.46-0.66 (116H, m)

[2] Mass spectrometric analysis by MALDI-TOF-MS: m/z=1605.004 (M)

Analysis Result of Compound (31)

[1] $^1$H-NMR (400 MHz, CDCl$_3$, room temperature): δ (ppm)=14.76 (2H, s), 7.70 (1H, t), 7.45 (4H, s), 7.36 (2H, s), 7.18 (2H, s), 7.15 (1H, t), 3.47-3.39 (8H, m), 3.15 (6H, d), 2.65 (6H, s), 1.84-1.75 (3H, br), 1.58-0.73 (119H, m)

Production of Ink

Inks according to embodiments of the present invention and comparative inks were produced by methods described below.

Example 12

Production Example of Ink (1)

Five parts of compound (1) serving as a dye compound according to an embodiment of the present invention was mixed with 350 parts of toluene, 350 parts of ethyl acetate, and 300 parts of 2-butanone to provide ink (1) according to an embodiment of the present invention.

Examples 13 to 22

Production Examples of Ink (2), (10), (15), (21), (24), (25), (26), (28), (29), and (31)

Inks (2), (10), (15), (21), (24), (25), (26), (28), (29), and (31) were produced in the same way as in the production example of ink (1) according to Example 12, except that compounds (2), (10), (15), (21), (24), (25), (26), (28), (29), and (31), respectively, were used in place of compound (1) serving as a dye compound.

Comparative Examples 1 to 3

Production Examples of Comparative Ink (1) to (3)

Comparative inks (1), (2), and (3) were produced in the same way as in the production example of ink (1) according to Example 12, except that comparative compounds (1) (2), and (3) illustrated below were used in place of compound (1) serving as a dye compound.

Structures of comparative compounds (1), (2), and (3) are illustrated below.

[Chem. 11]

COMPARATIVE COMPOUND (1)

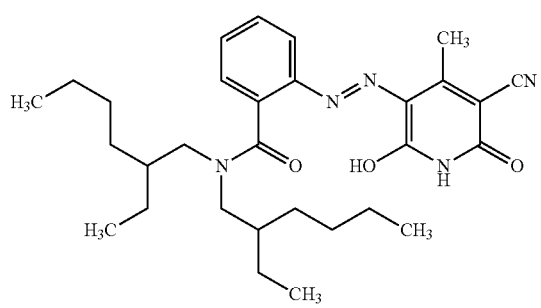

[Chem. 12]

COMPARATIVE COMPOUND (2)

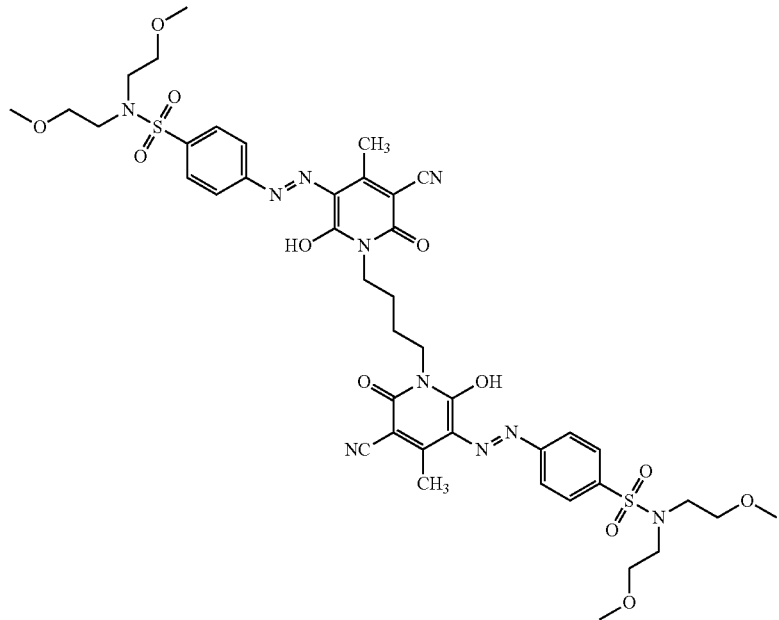

[Chem. 13]

COMPARATIVE COMPOUND (3)

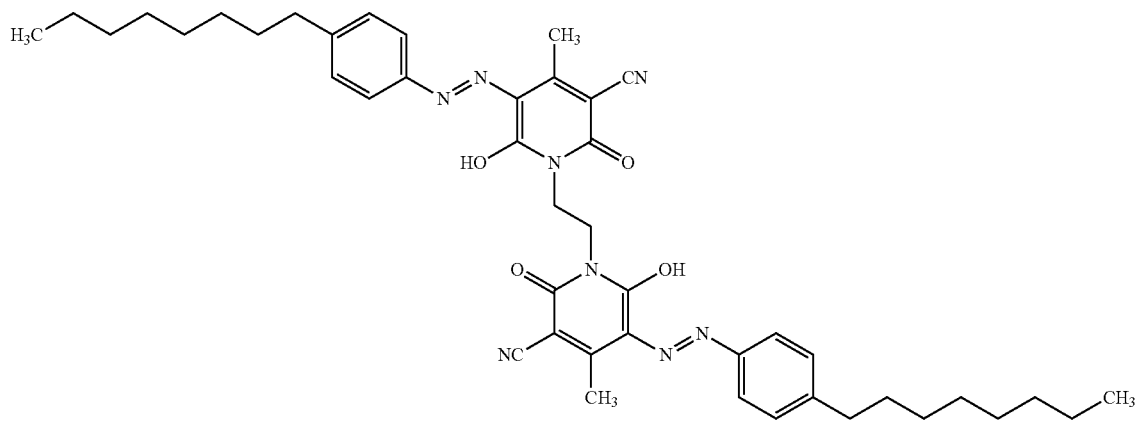

Evaluation of Chroma
Sample Preparation

Inks (1), (2), (10), (15), (21), (24), (25), (26), (28), (29), and (31) and comparative inks (1) to (3) were applied to hiding-power test sheets by bar coating (bar No. 10). The resulting coatings were air-dried overnight, thereby providing image samples. With respect to each of the image samples, the chromaticity (L*, a*, b*) in the L*a*b* color specification system was measured with a reflection densitometer (SpectroLino, manufactured by Gretag Macbeth).

The chroma (C*) was calculated from the following expression on the basis of the measured values of color characteristics.

$$C^* = \sqrt{(a^*)^2 + (b^*)^2}$$ [Math. 1]

The evaluation was performed as follows: Values of a* and b* when L* was 92 were determined by interpolation from L*, a*, and b* obtained from each image sample. Then C* was calculated. In the case where the amount of the colorant per unit area is constant, a higher value of chroma C* indicates that the chroma is better. The evaluation criteria are described below.
A: C* is 112 or more (very good chroma)
B: C* is 108 or more and less than 112 (good chroma)
C: C* is less than 108 (poor chroma)
Evaluation of Light Fastness Each of the image samples produced for the chroma measurement were placed in a xenon tester (Atlas Ci4000, available from Suga Test Instruments Co., Ltd.) and exposed for 20 hours under the conditions (illuminance: 0.39 W/m² at 340 nm, temperature: 40° C., and relative humidity: 60%). The reflection density of each sample was measured before and after the test. The color difference δE was defined as described below and calculated:

$$\Delta E = \sqrt{(a^* - a_0^*)^2 + (b^* - b_0^*)^2 + (L^* - L_0^*)^2}$$ [Math. 2]

where $a_0^*$, $b_0^*$, and $L_0^*$ each represent the initial chromaticity, and $a^*$, $b^*$, and $L^*$ each represent the chromaticity after exposure.

The evaluation criteria are described below.
A: δE<2.5 (very good light fastness)
B: 2.5≤δE<5 (good light fastness)
C: 5≤δE (poor light fastness)
Table 1 describes the evaluation results.

TABLE 1

| | Ink | Compound used | c* when L* = 92/ evaluation of color saturation | Light fastness ΔE/ evaluation of light fastness |
|---|---|---|---|---|
| Example 12 | ink (1) | compound (1) | 116/A | 2.45/A |
| Example 13 | ink (2) | compound (2) | 114/A | 2.98/B |
| Example 14 | ink (10) | compound (10) | 118/A | 1.68/A |
| Example 15 | ink (15) | compound (15) | 109/B | 3.98/B |
| Example 16 | ink (21) | compound (21) | 108/B | 4.53/B |
| Example 17 | ink (24) | compound (24) | 110/B | 4.20/B |
| Example 18 | ink (25) | compound (25) | 110/B | 4.71/B |
| Example 19 | ink (26) | compound (26) | 109/B | 2.35/A |
| Example 20 | ink (28) | compound (28) | 108/B | 4.82/B |
| Example 21 | ink (29) | compound (29) | 113/A | 3.78/B |
| Example 22 | ink (31) | compound (31) | 110/B | 4.96/B |
| Comparative Example 1 | comparative ink (1) | comparative compound (1) | 93.4/C | 7.96/C |
| Comparative Example 2 | comparative ink (2) | comparative compound (2) | 109/B | 6.36/C |
| Comparative Example 3 | comparative ink (3) | comparative compound (3) | 87.6/C | 5.98/C |

Table 1 demonstrates that the inks containing the dye compounds according to embodiments of the present invention are excellent in both chroma and light fastness, compared with the inks containing the comparative compounds.

Production of Resist Composition for Color Filter

Example 23

Twelve parts of compound (1) serving as a dye compound according to an embodiment of the present invention was mixed with 120 parts of cyclohexanone and dispersed for 1 hour with an attritor (manufactured by Mitsui Mining Co., Ltd.), thereby providing an ink according to an embodiment of the present invention.

First, 22 parts of the ink was slowly added to a solution of 6.7 parts of an acrylic copolymer composition (weight-average molecular weight Mw: 10,000) in which the monomer ratio of n-butyl methacrylate to acrylic acid to hydroxyethyl methacrylate was 40:30:30 (% by mass), 1.3 parts of dipentaerythritol pentaacrylate, and 0.4 parts of 2-benzyl-2-dimethylamino-1-(4-morpholinophenyl)butanone (photoinitiator) in 96 parts of cyclohexanone. The mixture was stirred at room temperature for 3 hours. The mixture was filtered with a 1.5-μm filter to provide resist composition (1) for a color filter according to an embodiment of the present invention.

Resist composition (1) for a color filter was applied to a glass substrate by spin coating. The resulting film was dried at 90° C. for 3 minutes, entirely exposed, and post-cured at 180° C. to produce color filter (1).

Examples 24 to 33

Color filters (2), (10), (15), (21), (24), (25), (26), (28), (29), and (31) were produced in the same way as in Example 23, except that resist compositions for color filters were prepared using compounds (2), (10), (15), (21), (24), (25), (26), (28), (29), and (31), respectively, in place of compound (1).

Comparative Examples 4 to 6

Comparative color filters (1), (2), and (3) were produced in the same way as in Example 23, except that resist compositions for color filters were prepared using comparative compounds (1), (2), and (3), respectively, in place of compound (1).

Evaluation of Chroma

The chromaticity (L*, a*, b*) of each of the color filters in the L*a*b* color specification system was measured with a reflection densitometer (SpectroLino, manufactured by Gretag Macbeth). As with the inks, a* and b* when L* was 92 were determined, and then C* was calculated. The evaluation criteria are described below.
A: C* is 112 or more (very high chroma)
B: C* is 108 or more and less than 112 (high chroma)
C: C* is less than 108 (poor chroma)
Evaluation of Light Fastness Each of the color-filter samples produced for the chroma measurement were placed in a xenon tester (Atlas Ci4000, available from Suga Test Instruments Co., Ltd.) and exposed for 30 hours under the conditions (illuminance: 0.39 W/m² at 340 nm, temperature: 40° C., and relative humidity: 60%). The reflection density of each sample was measured before and after the test. The color difference δE was defined as described below and calculated:

$$\Delta E = \sqrt{(a^* - a_0^*)^2 + (b^* - b_0^*)^2 + (L^* - L_0^*)^2}$$ [Math. 3]

where $a_0^*$, $b_0^*$, and $L_0^*$ each represent the initial chromaticity, and $a^*$, $b^*$, and $L^*$ each represent the chromaticity after exposure.

The evaluation criteria are described below.

A: δE<2.50 (very good light fastness)
B: 2.50≤δE<5.00 (good light fastness)
C: 5.00≤δE (poor light fastness)

TABLE 2

| Application | | c* when L* = 92/ evaluation of color saturation | Light fastness ΔE/ evaluation of light fastness |
|---|---|---|---|
| Example 23 | color filter (1) | 114/A | 2.80/B |
| Example 24 | color filter (2) | 111/A | 2.56/B |
| Example 25 | color filter (10) | 118/A | 1.33/A |
| Example 26 | color filter (15) | 109/B | 3.40/B |
| Example 27 | color filter (21) | 108/B | 4.08/B |
| Example 28 | color filter (24) | 108/B | 3.28/B |
| Example 29 | color filter (25) | 112/A | 2.53/B |
| Example 30 | color filter (26) | 113/A | 1.73/A |
| Example 31 | color filter (28) | 106/B | 4.82/B |
| Example 32 | color filter (29) | 115/A | 2.51/B |
| Example 33 | color filter (31) | 109/B | 4.97/B |
| Comparative Example 4 | comparative color filter (1) | 99.4/C | 9.38/C |
| Comparative Example 5 | comparative color filter (2) | 113/A | 7.59/C |
| Comparative Example 6 | comparative color filter (3) | 79.7/C | 8.40/C |

Table 2 demonstrates that the color filters containing the dye compounds according to embodiments of the present invention are excellent in both chroma and light fastness, compared with the color filters containing the comparative compounds.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-201704, filed Sep. 27, 2013, which is hereby incorporated by reference herein in its entirety.

INDUSTRIAL APPLICABILITY

Embodiments of the present invention provide a dye compound excellent in both chroma and light fastness, an ink, and a resist composition for a color filter, the ink and the color filter containing the dye compound.

The invention claimed is:

1. A dye compound represented by the general formula (1):

GENERAL FORMULA (1)

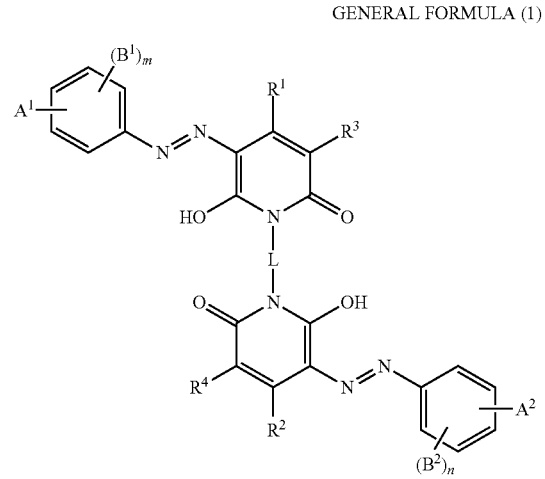

wherein in the general formula (1),
$R^1$ and $R^2$ each independently represent an alkyl group, an aryl group, or an amino group; $R^3$ and $R^4$ each independently represent a hydrogen atom, a cyano group, a carbamoyl group, a carboxylate group, or a carboxamide group,
L represents a linear alkylene group having 1 to 12 carbon atoms, a branched alkylene group having 1 to 12 carbon atoms, or a phenylene group,
m and n each independently represent an integer of 0 to 4,
i) when L represents a linear alkylene group having 1 to 12 carbon atoms or a branched alkylene group having 1 to 12 carbon atoms, $A^1$, $A^2$, $B^1$ in the case that m represents an integer of 1 to 4, and $B^2$ in the case that n represents an integer of 1 to 4, each independently represent a carboxamide group,
ii) when L represents a phenylene group, $A^1$, $A^2$, $B^1$ in the case that m represents an integer of 1 to 4, and $B^2$ in the case that n represents an integer of 1 to 4, each independently represent a sulfonate group, a carboxamide group, or a sulfonamide group; and
at least one of $A^1$ and $A^2$ represents a di(2-ethylhexyl) carboxamide group.

2. The dye compound according to claim 1, wherein in the general formula (1), moieties on both sides of the group represented by L have the same structure.

3. The dye compound according to claim 1, wherein in the general formula (1), L represents a linear alkylene group having 1 to 12 carbon atoms or a branched alkylene group having 1 to 12 carbon atoms.

4. The dye compound according to claim 3, wherein in the general formula (1), L represents an ethylene group.

5. An ink comprising:
the dye compound according to claim 1,
wherein the dye compound is dissolved or dispersed in a medium.

6. A resist composition for a color filter, comprising:
the dye compound according to claim 1;
a binder resin; and
a medium,
wherein the dye compound and the binder resin are dissolved or dispersed in the medium.

* * * * *